(12) United States Patent  (10) Patent No.: US 9,225,445 B2
Tajima et al.  (45) Date of Patent: Dec. 29, 2015

(54) DISPLAY CONTROL APPARATUS AND DISPLAY CONTROL METHOD

(71) Applicant: Panasonic Corporation, Osaka (JP)

(72) Inventors: Takashi Tajima, Kanagawa (JP); Yuji Hamada, Kanagawa (JP); Nobuyuki Onishi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 92 days.

(21) Appl. No.: 14/127,618

(22) PCT Filed: Nov. 30, 2012

(86) PCT No.: PCT/JP2012/007718
§ 371 (c)(1),
(2) Date: Dec. 19, 2013

(87) PCT Pub. No.: WO2013/080571
PCT Pub. Date: Jun. 6, 2013

(65) Prior Publication Data
US 2014/0125641 A1  May 8, 2014

(30) Foreign Application Priority Data

Nov. 30, 2011  (JP) .................................. 2011-261398

(51) Int. Cl.
*H04B 17/00* (2015.01)
*H04H 60/13* (2008.01)
(Continued)

(52) U.S. Cl.
CPC ................. *H04H 60/13* (2013.01); *G09G 5/00* (2013.01); *H04H 60/11* (2013.01); *H04H 60/44* (2013.01); *H04N 21/4312* (2013.01); *H04N 21/41407* (2013.01)

(58) Field of Classification Search
CPC ... H04H 60/11; H04H 60/44; H04H 21/4312; H04H 60/13; G09G 5/00
USPC ........................................................ 455/226.4
See application file for complete search history.

(56) References Cited

U.S. PATENT DOCUMENTS 8,938,687 B2 *  1/2015  Ahn et al. ...................... 715/782
2005/0058089 A1 *  3/2005  Vijayan ..................... H04B 7/12
370/312

(Continued)

FOREIGN PATENT DOCUMENTS

EP   1 134 919 A2   9/2001
JP   4-167825 A     6/1992

(Continued)

OTHER PUBLICATIONS

International Search Report for Application No. PCT/JP2012/007718 dated Feb. 19, 2013.

*Primary Examiner* — Ajibola Akinyemi
(74) *Attorney, Agent, or Firm* — RatnerPrestia

(57) ABSTRACT

A display control apparatus includes a reception frequency acquisition unit configured to acquire a reception frequency, a reception quality acquisition unit configured to acquire reception quality, a first data acquisition unit configured to acquire first data at a reception frequency, a second data acquisition unit configured to acquire second data from a signal of a reception frequency, a display control unit configured to control display of first data until acquisition of second data after acquisition of first data, and a display unit configured to display first data and/or second data in accordance with control of a display control unit.

12 Claims, 21 Drawing Sheets

RECEPTION FREQUENCY: 98.1MHz

A RECEPTION FREQUENCY IS DISPLAYED
(A) WHEN A BROADCAST STATION NAME OF ANALOG BROADCASTING HAS NOT BEEN ACQUIRED

(51) Int. Cl.
  *H04H 60/11* (2008.01)
  *G09G 5/00* (2006.01)
  *H04H 60/44* (2008.01)
  *H04N 21/431* (2011.01)
  *H04N 21/414* (2011.01)

(56) References Cited

U.S. PATENT DOCUMENTS

2006/0077300 A1* 4/2006 Cheon ............... H04L 25/03019
                                                            348/614
2012/0242687 A1* 9/2012 Choi ........................... 345/629
2014/0327600 A1* 11/2014 Ryou ........................... 345/1.3

FOREIGN PATENT DOCUMENTS

| | | |
|---|---|---|
| JP | 08-251051 A | 9/1996 |
| JP | 10-047979 A | 2/1998 |
| JP | 2001-257606 A | 9/2001 |
| JP | 2002-010222 A | 1/2002 |
| JP | 2006-153972 A | 6/2006 |
| JP | 2008-306310 A | 12/2008 |

* cited by examiner

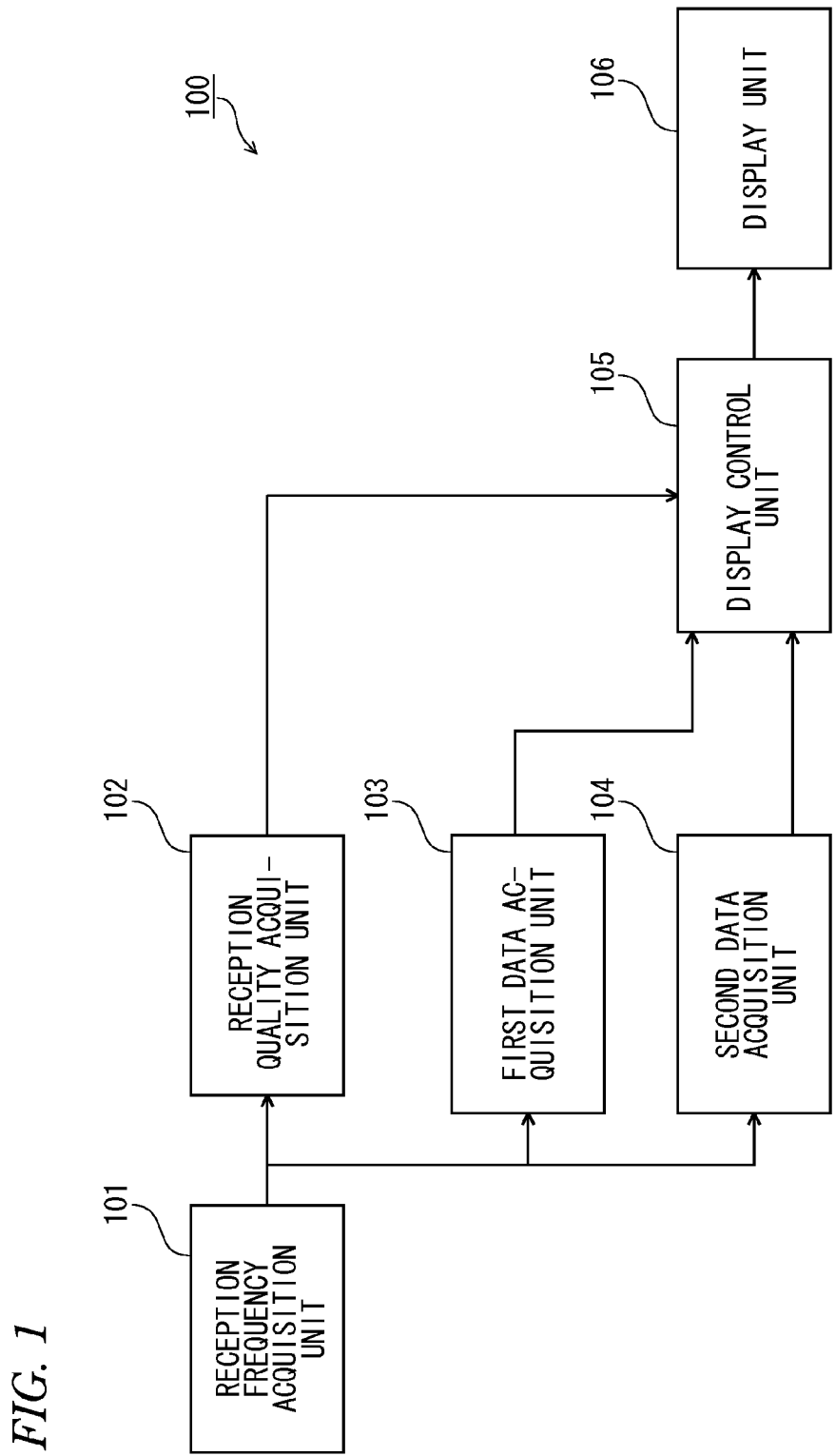

RECEPTION FREQUENCY: 98.1MHz (A) WHEN A BROADCAST STATION NAME OF ANALOG BROADCASTING HAS NOT BEEN ACQUIRED

A RECEPTION FREQUENCY IS DISPLAYED

RECEPTION FREQUENCY: 98.1MHz
BROADCAST STATION NAME OF ANALOG BROADCASTING: A STATION (B) WHEN A BROADCAST STATION NAME OF ANALOG BROADCASTING HAS BEEN ACQUIRED

A BROADCAST STATION NAME IS PREFERENTIALLY DISPLAYED

FIG. 4A

RECEPTION FREQUENCY: 98.1MHz
RECEPTION QUALITY: 10dB≤30dB

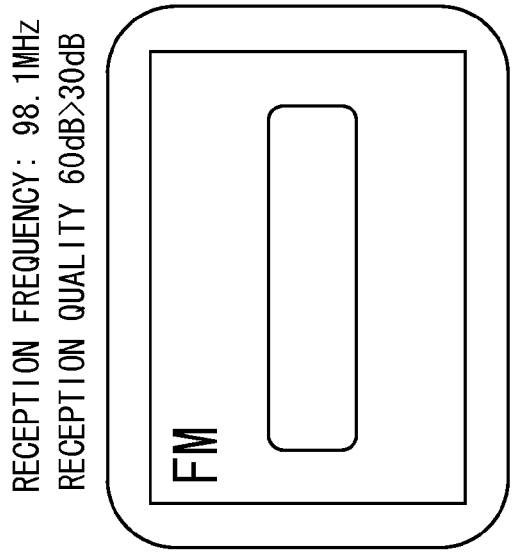

A RECEPTION FREQUENCY IS DISPLAYED (A) WHEN TIME TO ACQUIRE A BROADCAST STATION NAME OF ANALOG BROADCASTING IS ESTIMATED TO BE LONG

FIG. 4B

RECEPTION FREQUENCY: 98.1MHz
RECEPTION QUALITY: 60dB>30dB

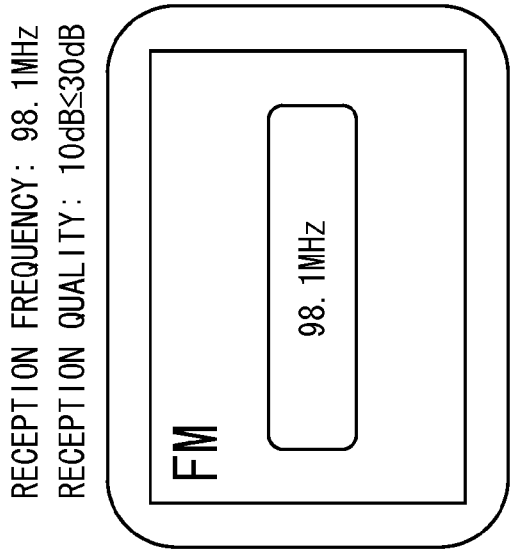

A RECEPTION FREQUENCY IS NOT DISPLAYED UNTIL ACQUISITION OF A BROADCAST STATION NAME (B) WHEN TIME TO ACQUIRE A BROADCAST STATION NAME OF ANALOG BROADCASTING IS ESTIMATED TO BE SHORT

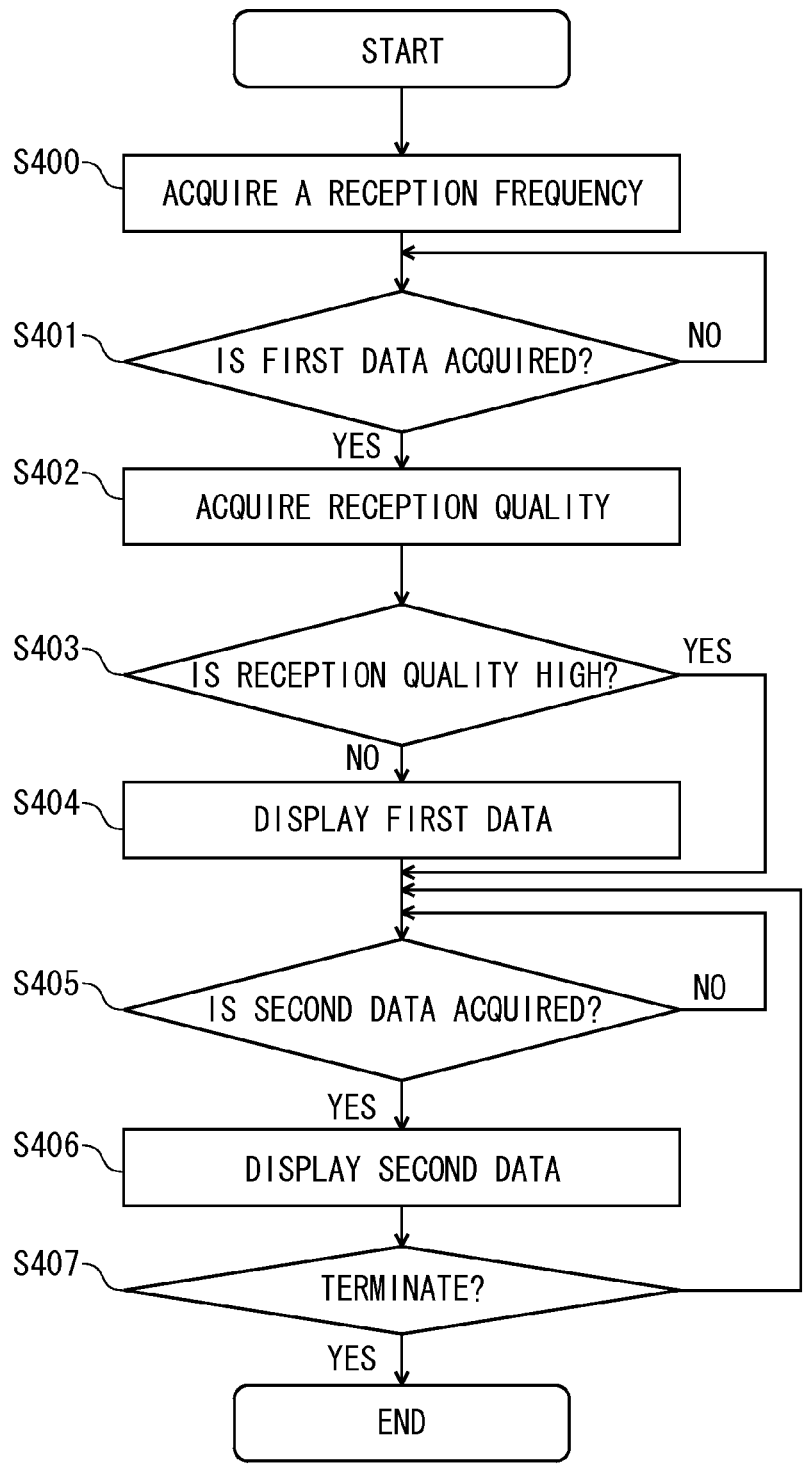

FIG. 7A

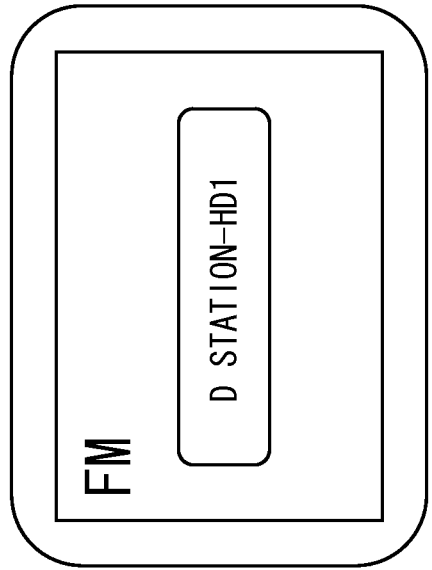

(A) WHEN BROADCAST STATION NAMES OF BOTH ANALOG BROADCASTING AND DIGITAL BROADCASTING HAVE BEEN ACQUIRED

BROADCAST STATION NAME OF ANALOG BROADCASTING: D STATION
BROADCAST STATION NAME OF DIGITAL BROADCASTING: DSTATION-HD1

FIG. 7B

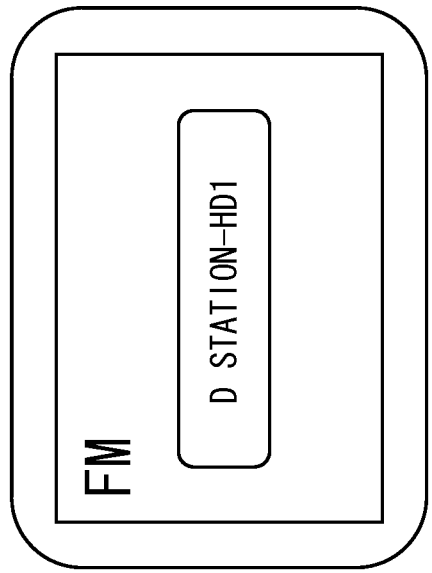

(B) WHEN A BROADCAST STATION NAME OF ONLY DIGITAL BROADCASTING HAS BEEN ACQUIRED

BROADCAST STATION NAME OF DIGITAL BROADCASTING: D STATION-HD1

FIG. 10A (A) DETERMINE TO BE A BROADCAST STATION CONFIGURED TO TRANSMIT SECOND DATA

A RECEPTION FREQUENCY IS CHANGED → WAITING FOR DETERMINATION, OR DETERMINED TO BE A BROADCAST STATION NOT CONFIGURED TO TRANSMIT SECOND DATA → SECOND DATA IS ACQUIRED → DETERMINE TO BE A BROADCAST STATION CONFIGURED TO TRANSMIT SECOND DATA → TIME

FIG. 10B (B) DETERMINE TO BE A BROADCAST STATION NOT CONFIGURED TO TRANSMIT SECOND DATA

A RECEPTION FREQUENCY IS CHANGED → WAITING FOR DETERMINATION → RECEPTION QUALITY IS 60dB>30dB → 10 SECONDS → WAITING FOR DETERMINATION → 10 SECONDS ELAPSED WITH RECEPTION QUALITY REMAINED AT 30dB OR HIGHER → DETERMINE TO BE A BROADCAST STATION NOT CONFIGURED TO TRANSMIT SECOND DATA → TIME

*FIG. 11*

| RECEPTION FREQUENCY | TRANSMISSION OF SECOND DATA |
|---|---|
| 87.9MHz | WAITING FOR DETERMINATION |
| 88.1MHz | YES |
| 88.3MHz | NO |
| ... | ... |

FIG. 12A

FIRST DATA (A BROADCAST STATION NAME OF ANALOG BROADCASTING) "B STATION" IS ACQUIRED

RECEPTION FREQUENCY: 88.3MHz
RECEPTION QUALITY: 60dB>30dB

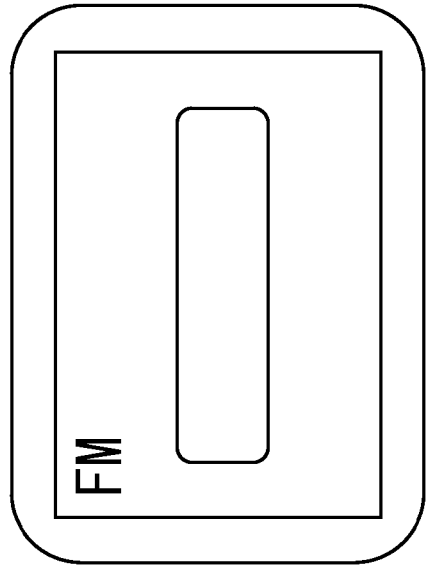

(A) WHEN NON-ACQUISITION OF SECOND DATA (A BROADCAST STATION NAME OF DIGITAL BROADCASTING) IS PREDICTED

FIG. 12B

FIRST DATA (A BROADCAST STATION NAME OF ANALOG BROADCASTING) "C STATION" IS ACQUIRED

RECEPTION FREQUENCY: 88.1MHz
RECEPTION QUALITY: 60dB>30dB

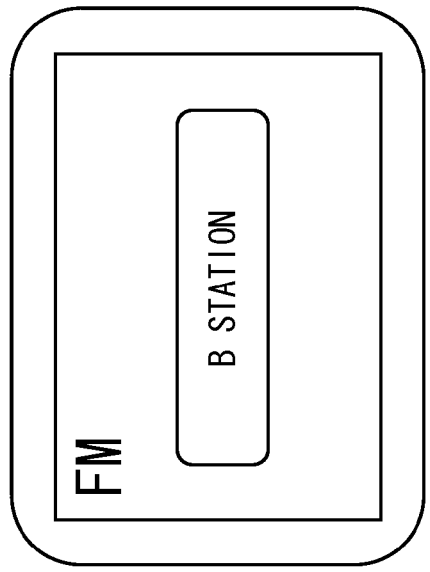

(B) WHEN TIME TO ACQUIRE SECOND DATA (A BROADCAST STATION NAME OF DIGITAL BROADCASTING) IS ESTIMATED TO BE SHORT

DISPLAY CONTROL APPARATUS AND DISPLAY CONTROL METHOD

TECHNICAL FIELD

The present invention relates to a display control apparatus and a display control method, which prevents flickering and improves visibility in display of character data in broadcast reception equipment.

BACKGROUND ART

In reception and display of character data of radio broadcasting or television broadcasting, time to obtain character data such as a broadcast station name and broadcast content is different depending on data type, reception situation, or broadcast content. This situation causes a problem. That is, when a user changes a receiving broadcast station, or when a vehicle driven by a user comes out of a tunnel and a reception condition improves, a plurality of data is intermittently displayed, which deteriorates the visibility. More specifically, as to the data being displayed at the same screen position, displayed data is updated immediately one after another, which turns out a screen flickering problem.

As a conventional solution to such a problem, there is a known navigation system, which estimates an interval of a timing to display a next intersection with an enlarged view by computing a distance and a vehicle speed. In this solution, displaying the traffic information is not permitted when the interval is less than a predetermined time (refer to Patent Document 1, for example).

Further, concerning a display item whose display duration time is set such as a first-display with its proceeding time for 6 seconds and a second-display for 3 seconds, if the second-display is prioritized to be executed after 2 seconds from the starting of the first-display execution, for instance, the first-display would be displayed only for 1 second after lapsing of the second-display, which causes the display screen to flicker. Like this, there is a known system such that when the remaining time of first-display is less than a predetermined value after lapsing the proceeding time of the second-display, the first-display would not be performed for the remaining time (refer to Patent Document 2, for example).

RELATED ART DOCUMENT

Patent Document

Patent Document 1: JP-A-10-047979
Patent Document 2: JP-A-2006-153972

DESCRIPTION OF THE INVENTION

Problems to be Solved by the Invention

However, in reception and display of character data of radio broadcasting or television broadcasting, obtaining time for character data cannot be estimated from a distance, vehicle speed, and display proceeding time. Thus, in the conventional configuration described above, there was a flickering problem in a display because display control to halt displaying character data was impossible.

It is an object of the invention to provide a display control apparatus and a display control method, which prevents displaying intermittent information, or prevents flickering on the screen in reception and display of character data of radio broadcasting or television broadcasting.

Means for Solving the Problems

One aspect of the present invention is directed to a display control apparatus which receives and displays character data. A display control apparatus according to one aspect of the invention, comprises: a reception frequency acquisition unit configured to acquire a frequency to be received, a reception quality acquisition unit configured to acquire reception quality of a signal of the reception frequency, a first data acquisition unit configured to acquire first data at the reception frequency, a second data acquisition unit configured to acquire second data from a signal of the reception frequency, a display control unit configured to control display of the first data until acquisition of the second data after acquisition of the first data, and a display unit configured to display the first data and/or the second data in accordance with control of the display control unit.

In the above display control apparatus, the display control unit controls not to display the first data at least until acquisition of the second data, when the reception quality is higher than a predetermined value.

The display control apparatus according to the above further comprises: a broadcast station determination unit which determines whether a broadcast station configured to broadcast a signal of the reception frequency is a broadcast station configured to transmit the second data, and a broadcast station storage unit which stores determination result of the broadcast station determination unit for each reception frequency, wherein the display control unit controls to display the first data, when the broadcast station storage unit stores a determination result that a broadcast station of the reception frequency is a broadcast station not configured to transmit the second data, even when the reception quality is higher than the predetermined value.

In the display control apparatus according to the above, the broadcast station determination unit determines a broadcast station configured to broadcast a signal to be a broadcast station configured to transmit the second data, when the second data is acquired from the signal of the reception frequency, and determines the broadcast station configured to broadcast the signal to be a broadcast station not configured to transmit the second data, when the second data is not acquired even after a predetermined time passes in a state that reception quality of a signal of the reception frequency remains at a predetermined value or higher.

The display control apparatus according to the above further comprises a third data acquisition unit which acquires, from the signal, third data that is information for determining whether the broadcast station configured to broadcast the signal of the reception frequency is a broadcast station configured to transmit second data, wherein the broadcast station determination unit determines the broadcast station configured to broadcast the signal of the reception frequency to be a broadcast station configured to transmit the second data, when the third data acquisition unit acquires the third data, and determines the broadcast station configured to broadcast the signal to be a broadcast station not configured to transmit the second data, when the third data is not acquired even after a predetermined time passes in a state that reception quality of a signal of the reception frequency remains at a predetermined value or higher.

The display control apparatus according to the above further comprises: a sub reception frequency acquisition unit configured to acquire a frequency received by a sub tuner; a sub reception quality acquisition unit configured to acquire reception quality of a signal of reception frequency of the sub tuner; a sub second data acquisition unit configured to acquire sub second data from a signal of the reception frequency of the sub tuner, and a sub broadcast station determination unit configured to determine whether the broadcast station configured to broadcast the signal of the reception frequency of the sub tuner is a broadcast station configured to transmit the second data, based on the reception quality of the signal of the reception frequency of the sub tuner and the sub second data, wherein the broadcast station storage unit stores a determination result of the sub broadcast station determination unit for each reception frequency.

The display control apparatus according to the above further comprises a stability determination unit configured to determine whether the reception quality is stable or unstable, wherein the display control unit controls to delay display of the first data, when the stability determination unit determines the reception quality to be unstable, even when the reception quality is not higher than a predetermined value.

The display control apparatus according to the above further comprises a vehicle speed acquisition unit configured to acquire speed information of a vehicle equipped with the display control apparatus, wherein the stability determination unit determines the reception frequency to be unstable, when a speed of the vehicle is higher than a predetermined value.

The display control apparatus according to claim 7, wherein the stability determination unit determines the reception quality to be unstable, when the reception quality changes greatly in most recent predetermined time.

In the display control apparatus according to the above, the display control unit controls to display the first data, when the reception quality decreases to a predetermined value or lower even once in a period from acquisition of the first data to acquisition of the second data.

Another aspect of the present invention is directed to a display control method that a display control apparatus receives and displays character data. A display control method according to another aspect of the invention comprises: a reception frequency acquisition step of acquiring a frequency to be received, a reception quality acquisition step of acquiring reception quality of a signal of the reception frequency, a first data acquisition step of acquiring first data at the reception frequency, a second data acquisition step of acquiring second data from a signal of the reception frequency, a display control step of controlling display of the first data until acquisition of the second data after acquisition of the first data, based on the reception quality, and a display step of displaying the first data and/or the second data in accordance with control on the display control step.

Advantages of the Invention

According to a display control apparatus and a display control method in the present invention, obtaining time for character data is estimated on the display control apparatus for receiving the character data and displaying the same, which is performed based on the receiving quality. In this way, the display control such as halting character-data display can be performed, which achieves effects of preventing intermittent information display or screen flickers and improves visibility.

BRIEF DESCRIPTION OF THE DRAWINGS

FIG. 1 is a block diagram showing an internal configuration of a display control apparatus of a first embodiment according to the invention.

FIG. 2A shows an example of display when a broadcast station name of analog broadcasting cannot be acquired. FIG. 2B shows an example of display when a broadcast station name of analog broadcasting can be acquired.

FIGS. 4A and 4B show examples of display in a display unit. FIG. 4A shows an example of display, when time to obtain a broadcast station name of analog broadcasting is estimated to be long. FIG. 4B shows an example of display, when time to obtain a broadcast station name of analog broadcasting is estimated to be short.

FIG. 5 is a flowchart showing operations of a display control apparatus of a first embodiment.

FIGS. 7A and 7B show examples of display in a display unit. FIG. 7A shows an example when both broadcast station name of analog broadcasting and broadcast station name of digital broadcasting are successfully acquired. FIG. 7B shows an example when a broadcast station name of only digital broadcasting is successfully acquired.

FIGS. 10A and 10B show examples that a broadcast station determination unit determines whether a broadcast station transmits second data. FIG. 10A shows an example of determining a broadcast station to be a broadcast station configured to transmit second data. FIG. 10B shows an example of determining a broadcast station to be a broadcast station not to transmit second data.

FIG. 11 is a table showing determination results stored in a broadcast station storage unit.

FIGS. 12A and 12B show examples of display in a display unit. FIG. 12A shows an example of display when non-acquisition of second data is predicted. FIG. 12B shows an example of display when time to obtain second data is estimated to be short.

MODE FOR CARRYING OUT THE INVENTION

Figure 2A:
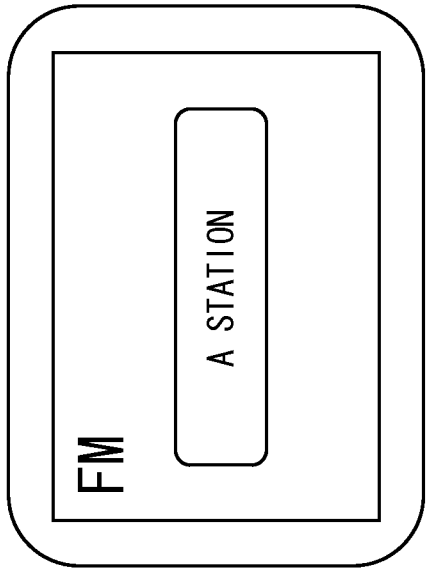
FIGS. 2A and 2B show examples of display in a display unit.

Hereinafter, embodiments of the invention will be explained with reference to the accompanying drawings.

Embodiments of the invention described hereinafter represent examples of preferred embodiments of the invention. Numeric values, shapes, components, component configurations, and connection forms are just examples, and not to be intended to limit the invention. The invention is to be limited only by the appended claims. Therefore, although the components not included in independent claims, among the components described in the embodiments, are not necessarily required to achieve the object of the invention, they will be explained as components to configure more preferable embodiments.

Embodiment 1

FIG. 1 is a block diagram showing an internal configuration of a display control apparatus 100 of an embodiment 1 according to the invention. The display control apparatus 100 shown in FIG. 1 comprises a reception frequency acquisition unit 101, a first data acquisition unit 103, a second data acquisition unit 104, a reception quality acquisition unit 102, a display control unit 105, and a display unit 106. Hereinafter, each component will be explained with reference to the drawing, and after that, the operations of the display control apparatus 100 will be explained.

The reception frequency acquisition unit 101 acquires a frequency of a broadcast station being received or to be received. The frequency is a reception frequency switched by a user's switching operation in FM radio, for example. The reception frequency acquisition unit 101 acquires a value as "98.1 MHz", for example.

The first data acquisition unit 103 acquires first data about a reception frequency as information to be displayed on the display unit 106. FIG. 2A shows an example of display of first data indicating a reception frequency "98.1 MHz" in FM radio.

Figure 2B:
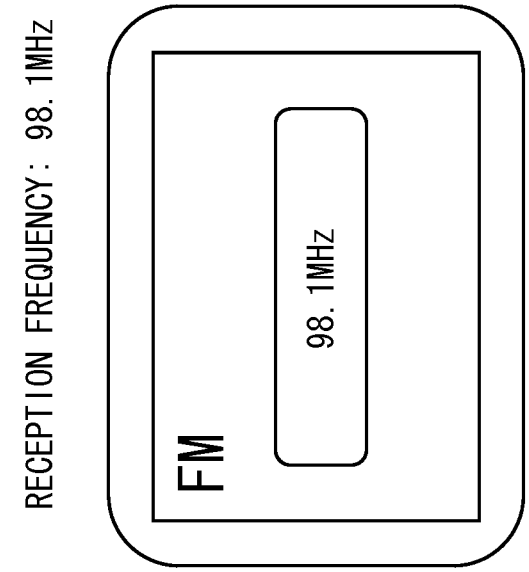

The second data acquisition unit 104 acquires second data about a broadcast station name, as information to be displayed on the display unit 106, from a signal of the reception frequency acquired by the reception frequency acquisition unit 101. FIG. 2B shows an example of display of second data indicating a broadcast station name "A STATION" in analog broadcasting of a reception frequency "98.1 MHz", in character data broadcasting such as a radio broadcast data system (hereinafter, called an RBDS) in FM radio.

The reception quality acquisition unit 102 acquires reception quality of a signal at a reception frequency acquired by the reception frequency acquisition unit 101. Reception quality might be electric field strength, for example. However, when interference by a signal of adjacent frequency is strong, the second data acquisition unit 104 requires more time to acquire the second data even if the electric field strength is high. Thus, reception quality is not restricted to electric field strength, but also other quality value which is calculated with consideration for the interference by a signal of adjacent frequency.

The display control unit 105 controls display on the display unit 106, based on a level of the reception quality acquired by the reception quality acquisition unit 102. For example, when the reception quality acquired by the reception quality acquisition unit 102 is higher than a predetermined value, the display control unit 105 estimates that time for the second data acquisition unit 104 to acquire second data is short, and it controls not to display the first data acquired by the first data acquisition unit 103 at least until acquisition of second data. Reception quality is electric field strength, for example, and a predetermined value is "30 dBµV", for example.

As shown in FIG. 4A, when reception quality of a signal from a broadcast station of a reception frequency "98.1 MHz" is "10 dBµV", the display control unit 105 estimates that time to acquire a broadcast station name of analog broadcasting as second data is long, because the reception quality is 30 dBµV or lower. In this case, the display control unit 105 controls the display unit 106 to display the reception frequency "98.1 MHz" as first data.

As shown in FIG. 4B, when reception quality of a signal from a broadcast station of a reception frequency "98.1 MHz" is 60 dBµV, the display control unit 105 estimates that time to acquire a broadcast station name as second data is short, because the reception quality is 30 dBµV or higher. In this case, the display control unit 105 controls the display unit 106 not to display the reception frequency "98.1 MHz" as first data, and to display a blank until acquisition of a broadcast station name as second data.

Under the control of the display control unit 105, the display unit 106 displays the first data acquired by the first data acquisition unit 103 and/or the second data acquired by the second data acquisition unit 104. As an example of displaying first data or second data, when a broadcast station name of analog broadcasting cannot be acquired, as shown in FIG. 2A, the display unit 106 displays a reception frequency "98.1 MHz" as first data. When a broadcast station name of analog broadcasting is successfully acquired, as shown in FIG. 2B, the display unit 106 displays a broadcast station name "A STATION" of analog broadcasting as second data. However, as shown in FIG. 4B, when the display control unit 105 controls not to display a reception frequency "98.1 MHz" as first data, and to display a blank until acquisition of a broadcast station name as second data, the display unit 106 displays a blank. This prevents flickering on the display unit 106.

Figure 3:
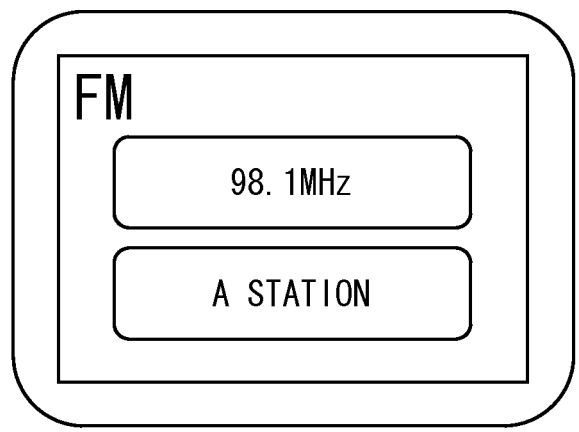
FIG. 3 shows an example of display in a display unit, when both frequency and broadcast station name is successfully acquired.

As an example of displaying first data or second data, as shown in FIG. 3, a case of displaying both reception frequency and broadcast station name is possible. In the above example, when a broadcast station name of analog broadcasting cannot be acquired, as shown in FIG. 2A, the display unit 106 displays a reception frequency "98.1 MHz" as first data. As another example, when a broadcast station name of analog broadcasting can be acquired, as shown in FIG. 3, the display unit 106 displays both reception frequency "98.1 MHz" as first data and broadcast station name "A STATION" of analog broadcasting as second data. However, as shown in FIG. 4B, when the display control unit 105 controls not to display a reception frequency "98.1 MHz" as first data, and to display a blank until acquisition of a broadcast station name as second data, the display unit 106 displays a blank. This improves visibility, because an analog broadcast station name is not additionally displayed immediately after a reception frequency is displayed. Intermittent display includes such an additional display in a short time. It is, however, possible to prevent flickering by controlling display as described above.

Next, operations of the display control apparatus 100 of the embodiment are explained with reference to FIG. 5. FIG. 5 is a flowchart showing operations of the display control apparatus 100 of the embodiment 1.

The reception frequency acquisition unit 101 acquires a frequency of a broadcast station being received or to be received (step S400). Next, the data acquisition unit 103 acquires first data about a reception frequency from a value of the frequency acquired in step S400 (step S401). When the first data can be acquired in step S401 (Yes in step S401), go to step S402. When the first data cannot be acquired in step S401 (No in step S401), go back to step S401.

In step S402, the reception quality acquisition unit 102 acquires reception quality of a signal at a reception frequency acquired by the reception frequency acquisition unit 101. Next, the display control unit 105 determines whether the reception quality acquired by the reception quality acquisition unit 102 is higher than a predetermined value (step S403). When the reception quality is higher than a predetermined value (Yes in step S403), go to step S405. When the reception quality is not higher than a predetermined value (No in step S403), go to step S404. In step S404, the display unit 106 displays the first data acquired by the first data acquisition unit 103.

Next, in step S405, the second data acquisition unit 104 acquires second data about a broadcast station name at a reception frequency acquired by the reception frequency acquisition unit 101. When second data can be acquired in step S405 (Yes in step S405), go to step S406. When second data cannot be acquired in step S405 (No in step S405), go back to step S405. In step S406, the display unit 106 displays the second data acquired by the second data acquisition unit 104.

Next, the display control unit 100 determines whether to terminate a sequence of operations (step S407). To terminate a sequence of operations (Yes in step S407), end the flow. Not to terminate a sequence of operations (No in step S407), go back to step S405.

As explained above, in broadcasting of character data such as an RBDS, the display control unit 105 estimates time to acquire second data, based on reception quality of a signal from a broadcast station, and when the time is short, controls the display unit 106 not to display first data and to display a blank. This prevents screen flickering due to intermittent display or on-off display of information on the display unit 106. As a result, visibility of information displayed on the display unit 106 can be improved. Further, when time to acquire second data is long, first data is immediately displayed on the display unit 106. This can reduce time to display a blank on the display unit 106. In addition, the display control unit 105 may control to display first data, when reception quality decreases to a predetermined value or lower even once during the period from acquisition of first data to acquisition of second data.

Embodiment 2

When First Data May not be Acquired

In the embodiment 1, the first data acquisition unit 103 acquires a reception frequency as first data. However, first data includes data that the first data acquisition unit 103 cannot acquire. For example, it is assumed that first data is a broadcast station name of analog broadcasting in a RDBS, and second data is a broadcast station name in data broadcasting of digital broadcasting. In addition, analog broadcasting and digital broadcasting perform the same broadcast at the same frequency.

In analog broadcasting, a certain broadcast station does not perform an RBDS. In other words, there is a broadcast station not configured to transmit first data. In this case, second data cannot be displayed as long as waiting for first data. In a case where first data is not yet acquired when second data was already acquired, the display control apparatus of the embodiment 2 displays second data on the display unit 106 immediately after acquiring the second data. This is particularly useful when first data cannot be acquired, though time to acquire second data is long.

Figure 6:
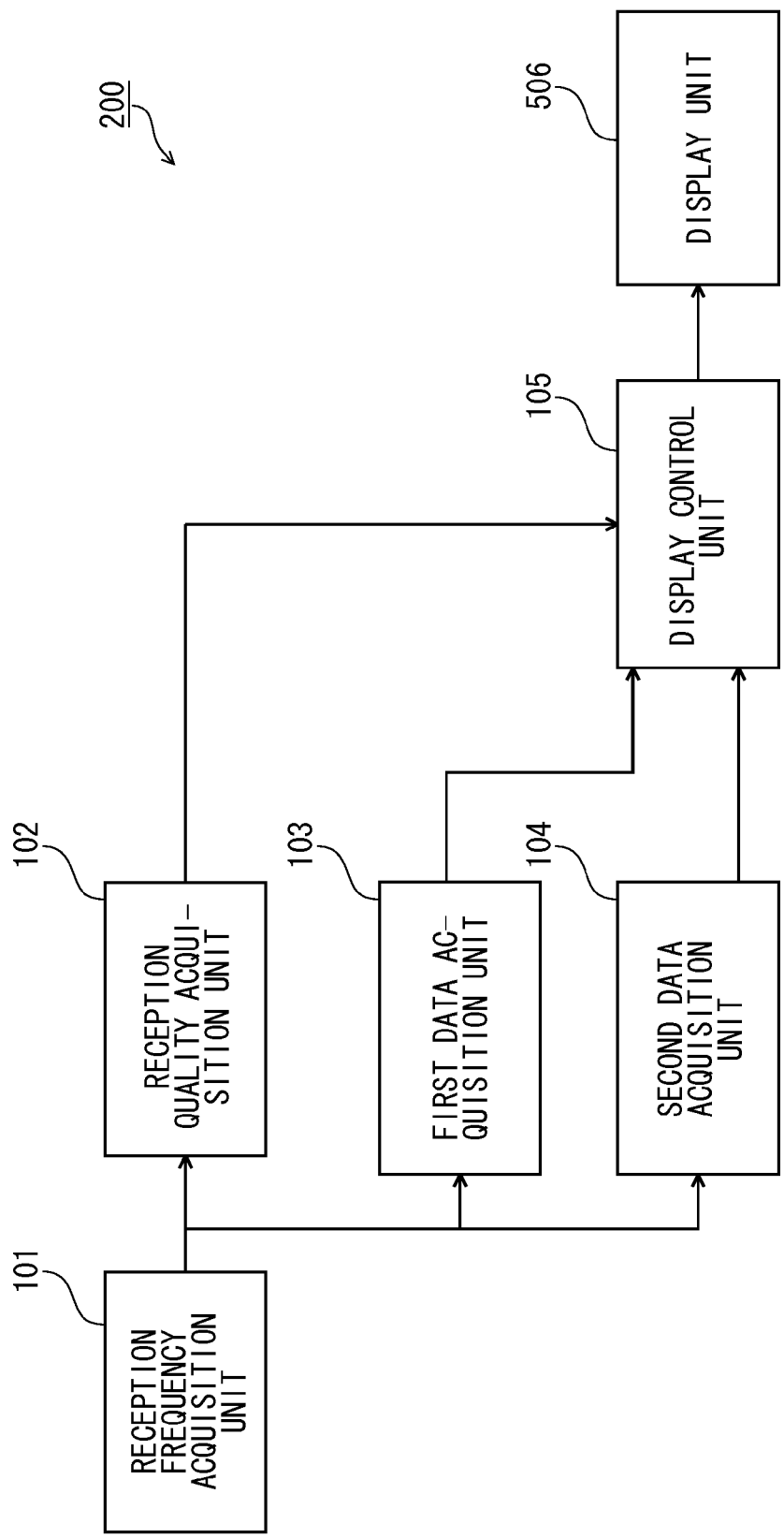
FIG. 6 is a block diagram showing an internal configuration of a display control apparatus of a second embodiment.

FIG. 6 is a block diagram showing an internal configuration of a display control apparatus 200 of the embodiment 2. The same reference numerals and signs are assigned to the same components as those of the display control apparatus 100 of the embodiment 1 shown in FIG. 1, and description thereof is omitted. The display control apparatus 200 of embodiment 2 is provided with a display unit 506 instead of the display unit 106.

The display unit 506 displays first data acquired by the first data acquisition unit 103 or second data acquired by the second data acquisition unit 104, under the control of the display control unit 105. In the embodiment, when both broadcast station name of analog broadcasting as first data and broadcast station name of digital broadcasting as second data have been acquired, as shown in FIG. 7A, the display unit 506 preferentially displays the station name of digital broadcasting as second data. On the other hand, when a broadcast station name of analog broadcasting as first data has not been acquired, but a broadcast station name of digital broadcasting as second data has been acquired, as shown in FIG. 7B, the display control unit 105 determines the broadcast station not configured to transmit the broadcast station name of analog broadcasting as the first data, and the display unit 506 immediately displays the broadcast station name of digital broadcasting as second data.

Figure 8:
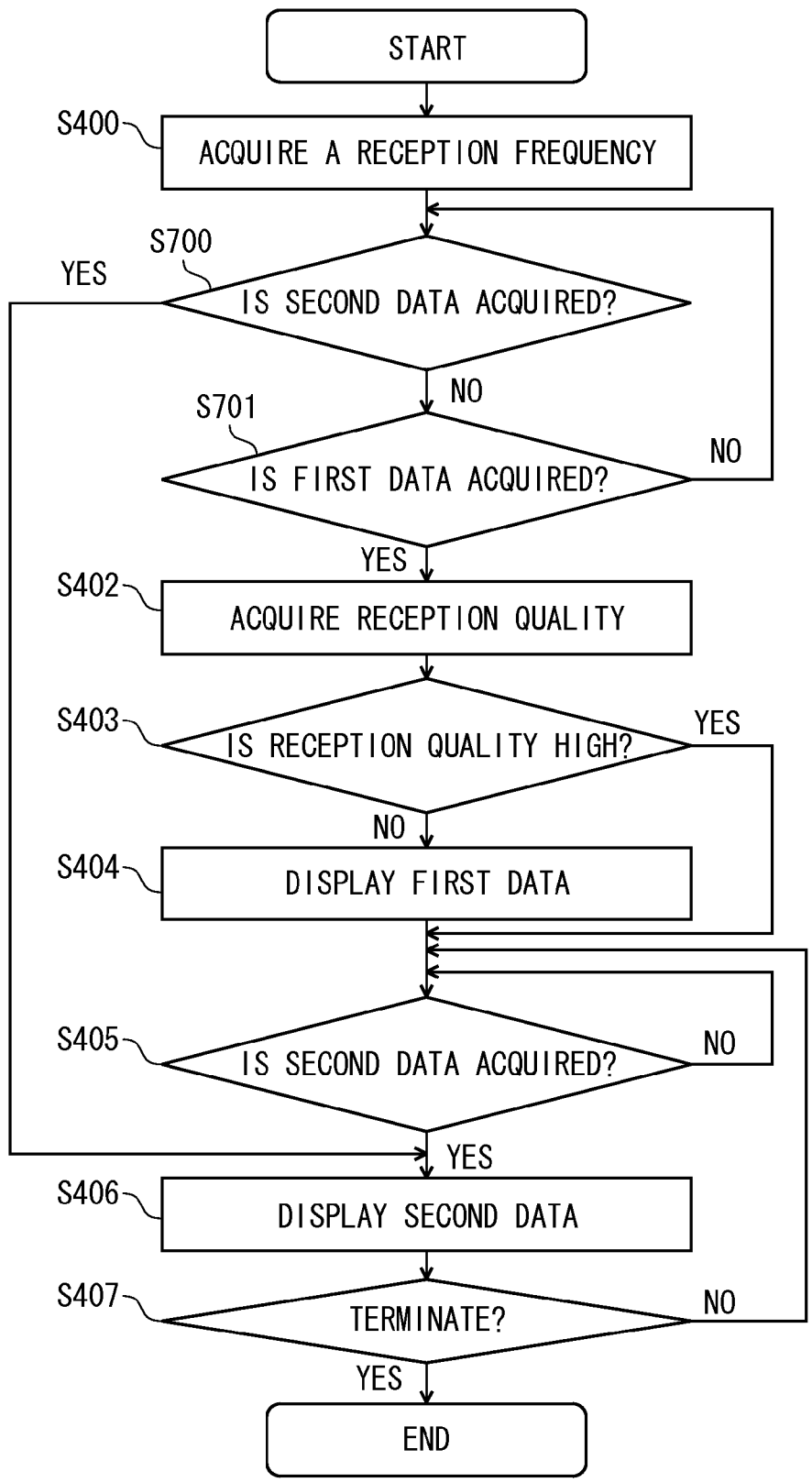
FIG. 8 is a flowchart showing operations of a display control apparatus of a second embodiment.

Next, operations of the display control apparatus 200 are explained with reference to FIG. 8. FIG. 8 is a flowchart showing operations of the display control apparatus 200 of the embodiment 2. In the flowchart shown in FIG. 8, step S700 and step S701 are performed instead of step S401 in the flowchart shown in FIG. 5.

The reception frequency acquisition unit 101 acquires a frequency of a broadcast station being received or to be received (step S400). Next, the second data acquisition unit 104 acquires second data from a signal of the reception frequency acquired in step S400 (step S700). When second data can be acquired in step S700 (Yes in step S700), go to step S406. When second data cannot be acquired in step S700 (No in step S700), go to step S701.

Next, in step S701, the first data acquisition unit 103 acquires first data from a signal of the reception frequency acquired in step S400. When first data can be acquired in step S701 (Yes in step S701), go to step S402. When first data cannot be acquired in step S701 (No in step S701), go back to step S700. Operations of step S402 or later in the embodiment are the same as those of the flowchart of the embodiment 1 shown in FIG. 5.

As described above, in the embodiment, in a case where first data has not been acquired when second data has been acquired, second data can be displayed on the display unit 506 immediately after acquiring second data.

Embodiment 3

Example Assuming the Presence of a Broadcast Station not Originally Configured to Transmit Character Data In the embodiment 1, as second data acquired by the second data acquisition unit 104, a broadcast station name indicated by character data transmitted by character data broadcasting in FM radio has been explained as an example. However, a certain broadcast station does not perform character data broadcasting; namely, a certain broadcast station does not transmit second data from the first. In this case, even when reception quality of a signal from a broadcast station is high, the second data acquisition unit 104 cannot acquire second data for a long time. When reception quality is high, the display control apparatus of the embodiment 3 displays first data if second data cannot be acquired even after waiting for a predetermined time. For example, when second data cannot be acquired even after ten seconds since the display control unit 105 has determined not to display first data, first data is displayed on the display unit 106.

Embodiment 4

Example Assuming the Presence of a Broadcast Station not Originally Configured to Transmit Character Data In the embodiment 3, when a state unable to acquire second data is unchanged even after a predetermined time, first data is displayed. Thus, display of first data is always delayed by a predetermined time. However, a broadcast station not originally configured to transmit second data is known.

Therefore, when the display control apparatus displays first data without waiting for second data, response of the apparatus to a user is increased. Thus, the display control apparatus of the embodiment previously searches for each frequency whether a broadcast station transmits second data, and displays first data regardless of reception quality in a broadcast station not configured to broadcast second data. This is useful when broadcast stations configured to and not to transmit second data are mixed.

For example, first data is assumed to be a broadcast station name of analog broadcasting in an RDBS, and second data is assumed to be a broadcast station name in data broadcasting of digital broadcasting in an RBDS. Analog broadcasting and digital broadcasting perform the same broadcast at the same frequency. In some areas, a broadcast station supporting only analog broadcasting is mixed with a broadcast station supporting both analog and digital broadcasting. In other words, a specific broadcast station supports only analog broadcasting, and does not transmit second data. In this case, a display control apparatus receiving a signal from a specific broadcast station cannot acquire a broadcast station name of digital broadcasting as second data for a long time, and even when reception quality is high, it is better to immediately display first data as a broadcast station name of analog broadcasting.

Figure 9:
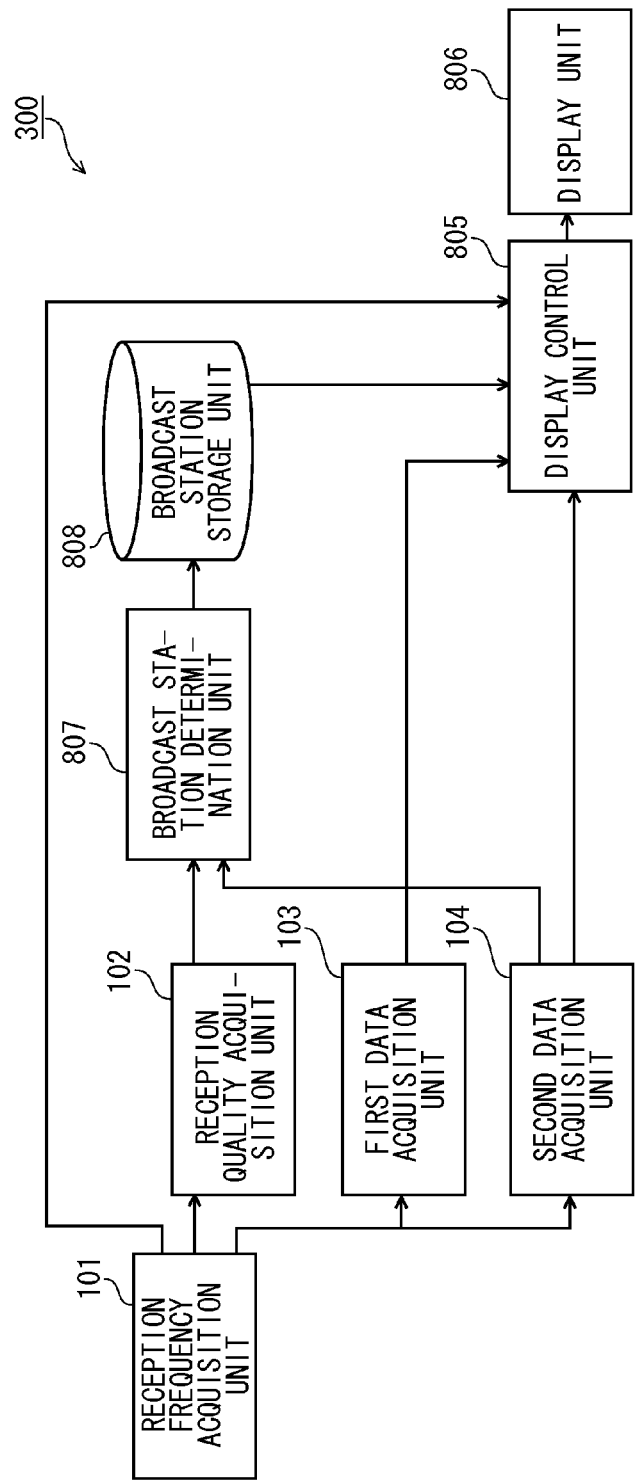
FIG. 9 is a block diagram showing an internal configuration of a display control apparatus of a fourth embodiment.

FIG. 9 is a block diagram showing an internal configuration of a display control apparatus 300 of the embodiment 4. The same reference numerals and signs are assigned to the same components as those of the display control apparatus 100 of the embodiment 1 shown in FIG. 1, and description thereof is omitted. The display control apparatus 300 of the embodiment 4 is provided with a display unit 806 instead of the display unit 106, and is further provided with a broadcast station determination unit 807, and a broadcast station storage unit 808.

The broadcast station determination unit 807 determines whether a broadcast station configured to broadcast a signal of the reception frequency acquired by the reception frequency acquisition unit 101 is a broadcast station configured to transmit second data as character data, based on the reception quality acquired by the reception quality acquisition unit 102 and the second data acquired by the second data acquisition unit 104. Specifically, when the second data acquisition unit 104 acquires second data, the broadcast station determination unit 807 determines the broadcast station to be a broadcast station configured to transmit second data. On the other hand, the broadcast station determination unit 807 determines that broadcast station to be a broadcast station not configured to transmit second data, when second data cannot be acquired even after a predetermined time in a state that the reception quality acquired by the reception quality acquisition unit 102 remains at a predetermined value or higher.

For example, as shown in FIG. 10A, even in a state waiting for determination by the broadcast station determination unit 807, or a state determined such that a broadcast station is not configured to transmit second data, when second data is acquired at a reception frequency, the broadcast station determination unit 807 determines this broadcast station is a broadcast station configured to transmit second data. On the other hand, as shown in FIG. 10B, in a case where second data is not acquired after a reception frequency is changed in a state waiting for determination by the broadcast station determination unit 807 at a reception frequency, even in a condition such that a state with the reception quality being higher than a predetermined value (30 dBμV) is kept continuously for a predetermined time, for example ten seconds, the broadcast station determination unit 807 determines this broadcast station is a broadcast station configured not to transmit second data.

The broadcast station storage unit 808 stores results of determination by the broadcast station determination unit 807, with respect to each reception frequency, that is, whether a broadcast station is configured to transmit second data, not to transmit second data, or waiting for determination. For example, in the example shown in FIG. 11, "waiting for determination" with respect to a reception frequency "87.9 MHz" is stored. "Waiting for determination" indicates that determination is not yet made as to whether a broadcast station is configured to transmit second data or not to transmit it. For a reception frequency "88.1 MHz", "Yes" is stored, indicating that a broadcast station is configured to transmit second data. For a reception frequency "88.3 MHz", "No" is stored, indicating that a broadcast station is not configured to transmit second data.

When the reception quality acquired by the reception quality acquisition unit 102 is higher than a predetermined value at the reception frequency acquired by the reception quality acquisition unit 101, the display control unit 805 of the embodiment estimates that time for the second data acquisition unit 104 to acquire second data is short, and controls not to display the first data acquired by the first data acquisition unit 103 at least until acquisition of second data. However, when the determination result stored in the broadcast station storage unit 808, at the reception frequency acquired by the reception frequency acquisition unit 101, is "No", the display control unit 805 predicts that second data is not acquired. And, the display control unit 805 controls the display unit 806 to immediately display the first data acquired by the first data acquisition unit 103. Reception quality is electric field strength, for example, and a predetermined value is 30 dBμV, for example.

As shown in FIG. 12A, when reception quality of a signal from a broadcast station of a reception frequency "88.3 MHz" is "60 dBμV" and first data (a broadcast station name of analog broadcasting) "B STATION" has been acquired, the display control unit 805 determines the broadcast station of the reception frequency "88.3 MHz" is a broadcast station not configured to acquire second data (a broadcast station name of digital broadcasting) by referring to the determination result stored in the broadcast station storage unit 808 shown in FIG. 11. At this time, the display control unit 805 controls the display unit 806 to immediately display "B STATION". Further, as shown in FIG. 12B, when reception quality of a signal from a broadcast station of a reception frequency "88.1 MHz" is "60 dBμV" and first data (a broadcast station name of analog broadcasting) "C STATION" has been acquired, the display control unit 805 determines the broadcast station of the reception frequency "88.1 MHz" is a broadcast station configured to acquire second data (a broadcast station name of digital broadcasting) by referring to the determination result stored in the broadcast station storage unit 808 shown in FIG. 11. At this time, the display control unit 805 controls the display unit 806 not to immediately display the first data (a broadcast station of analog broadcasting) "C STATION", and to display a blank until acquisition of second data (a broadcast station name of digital broadcasting).

The display unit 806 displays the first data acquired by the first data acquisition unit 103 and/or the second data acquired by the second data acquisition unit 104, under the control of the display control unit 805. For example, as shown in FIG. 12A, when the display control unit 805 determines to immediately display first data (a broadcast station name of analog broadcasting) "B STATION", the display unit 806 immediately displays the first data (a broadcast station name of analog broadcasting) "B STATION". As shown in FIG. 12B, when the display control unit 805 determines not to immediately display first data (a broadcast station name of analog broadcasting) "C STATION", the display unit 806 displays a blank until acquisition of second data (a broadcast station name of digital broadcasting), and displays the second data (a broadcast station name of digital broadcasting) when the second data (a broadcast station name of digital broadcasting) is acquired.

Figure 13:
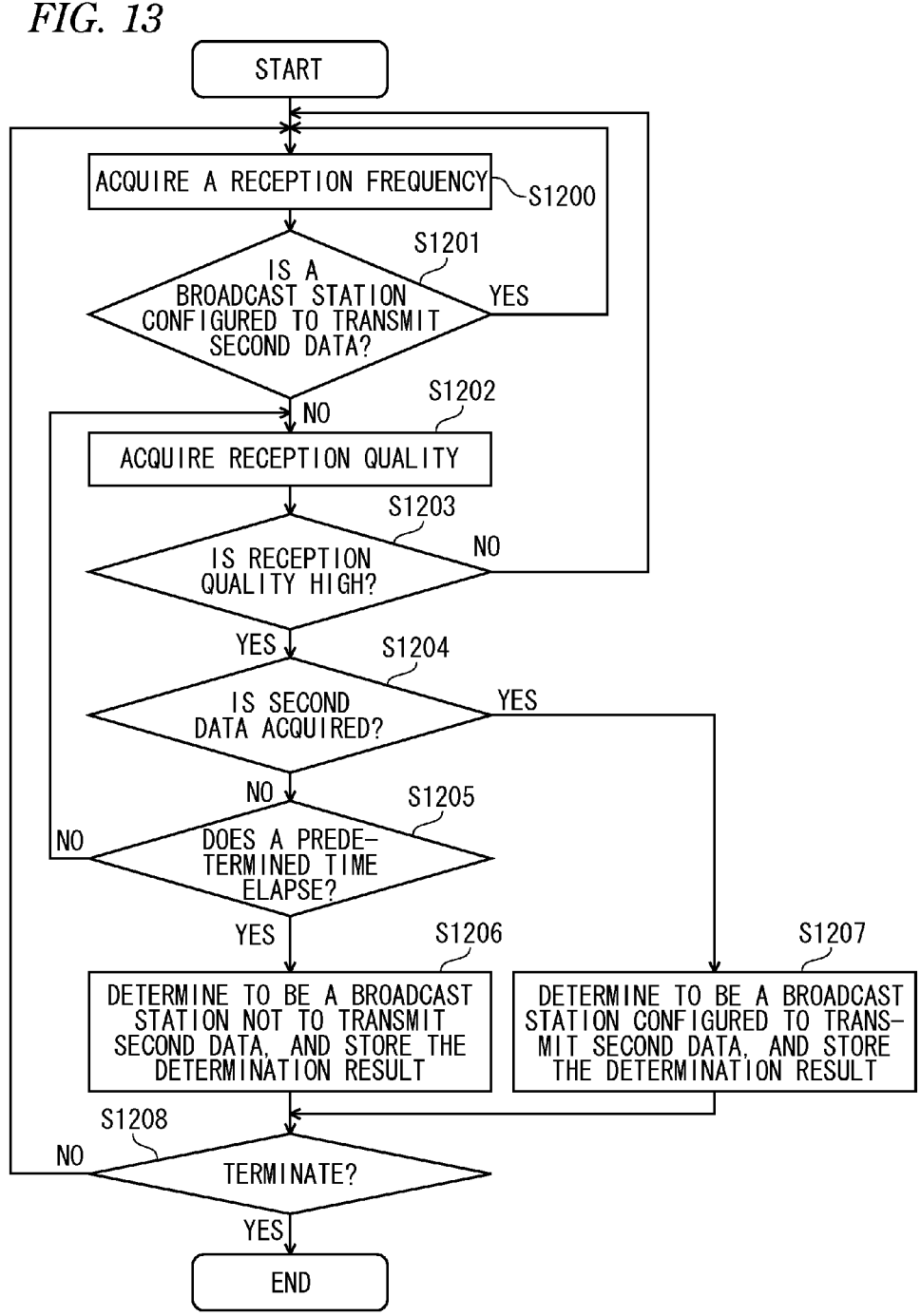
FIG. 13 is a flowchart showing data updating operations of a broadcast station storage unit performed by a display control apparatus of a fourth embodiment.

Next, a data update operation of the broadcast station storage unit 808 performed by the display control apparatus 300 of the embodiment is explained with reference to FIG. 13. FIG. 13 is a flowchart showing a data update operation of the broadcast station storage unit 808 performed by the display control apparatus 300 of the embodiment 4.

The reception frequency acquisition unit 101 acquires a frequency of a broadcast station being received or to be received (step S1200). The broadcast station determination unit 807 determines whether the broadcast station of the reception frequency acquired by the reception frequency acquisition unit 101 is a broadcast station configured to transmit second data, by referring to the determination result stored in the broadcast station storage unit 808 (step S1201). When the broadcast station is a broadcast station configured to transmit second data (Yes in step S1201), go back to step S1200. When the broadcast station is a broadcast station not configured to transmit second data (No in step S1201), go to step S1202.

In step S1202, the reception quality acquisition unit 102 acquires reception quality of a signal of the reception frequency acquired by the reception signal acquisition unit 101. Next, the display control unit 805 determines whether the reception quality acquired by the reception quality acquisition unit 102 is higher than a predetermined value (step S1203).

When the reception quality is higher than a predetermined value (Yes in step S1203), go to step 1204. When the reception quality is not higher than a predetermined value (No in step S1203), go back to step S1200. The second data acquisition unit 104 acquires second data (a broadcast station name of digital broadcasting) from a signal of the reception frequency acquired in step S1200 (step S1204). When second data can be acquired in step S1204 (Yes in step S1204), go to step S1207, while second data cannot be acquired (No in step S1204), go to step S1205.

In step S1205, the broadcast station determination unit 807 determines whether a predetermined time has passed while reception quality remains high. When a predetermined time has passed while the reception quality remains high (Yes in step S1205), go to step S1206. When a predetermined time has not passed (No in step S1205), go back to step S1202. In step S1206, the broadcast station determination unit 807 determines the broadcast station configured to broadcast a signal of the reception frequency acquired in step S1200 to be a broadcast station not configured to transmit second data, and stores the determination result in the broadcast station storage unit 808.

On the other hand, in step S1207, the broadcast station determination unit 807 determines the broadcast station configured to broadcast a signal of the reception frequency acquired in step S1200 to be a broadcast station configured to transmit second data, and stores the determination result in the broadcast station storage unit 808. Next, after steps S1206 and step S1207, the display control apparatus 400 determines whether to terminate a sequence of operations (step S1208), and finishes the flow to terminate the sequence (Yes in step S1208), and go back to step S1200 when not to terminate the sequence (No in step S1208).

Figure 14:
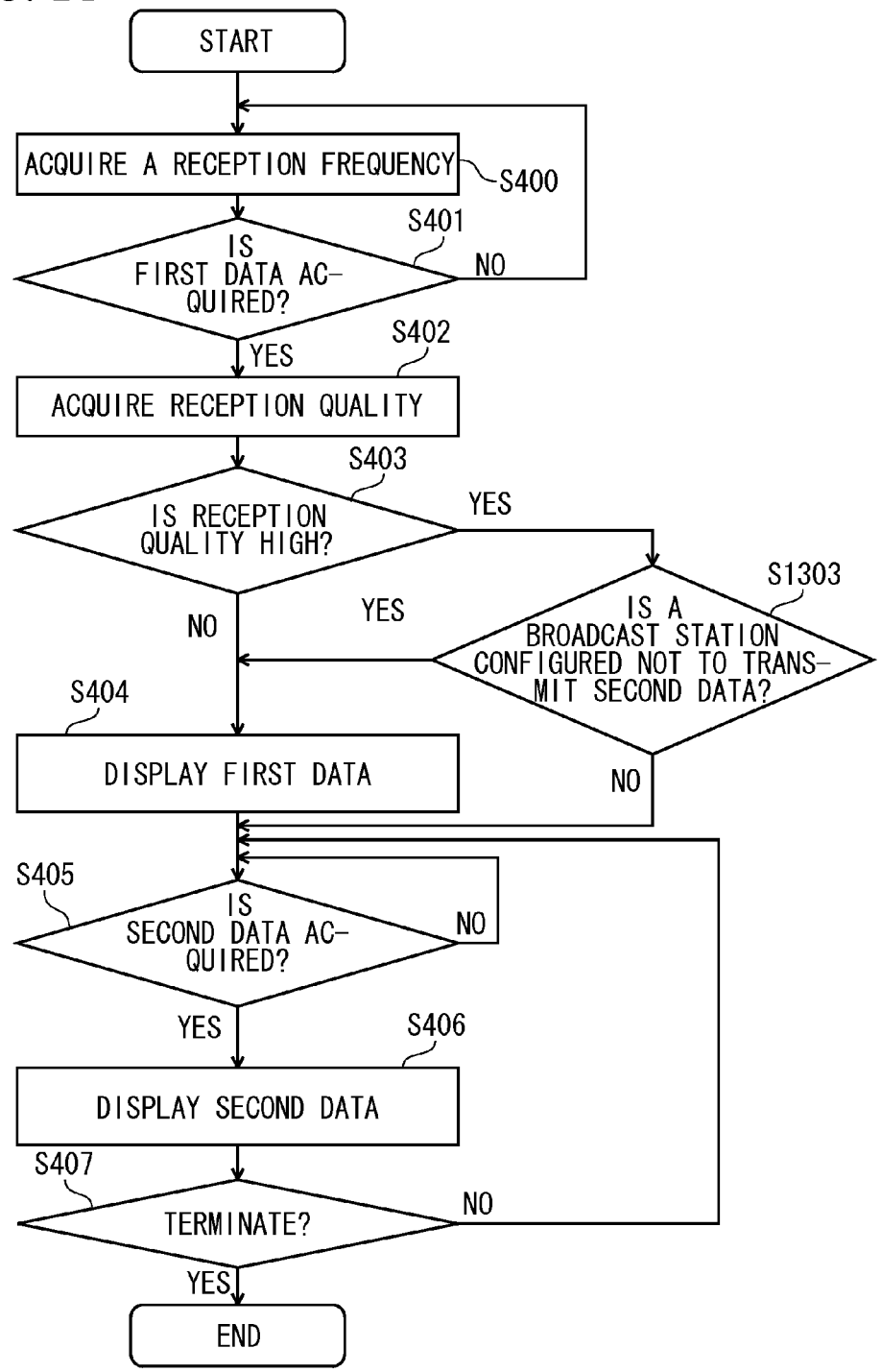
FIG. 14 is a flowchart showing a data display operation performed by a display control apparatus of a fourth embodiment.

Next, a data display operation performed by the display control apparatus 300 of the embodiment is explained with reference to FIG. 14. FIG. 14 is a flowchart showing a data display operation performed by the display control apparatus 300 of the embodiment 4. In the flowchart shown in FIG. 14, an operation of S1303 is performed in addition to the operations of the flowchart shown in FIG. 5.

The reception frequency acquisition unit 101 acquires a frequency of a broadcast station being received or to be received (step S400). Next, the first data acquisition unit 103 acquires first data about a reception frequency from a signal of the reception frequency acquired in step S400 (step S401). When first data can be acquired (Yes in step S401), go to step S402. When first data cannot be acquired (No in step S401), go back to step S401. In step S402, the reception quality acquisition unit 102 acquires reception quality of a signal of the reception frequency acquired by the reception frequency acquisition unit 101. Next, the display control unit 105 determines whether the reception quality acquired by the reception quality acquisition unit 102 is higher than a predetermined value (step S403). When the reception quality is higher than a predetermined value (Yes in step S403), go to step S1303. When the reception quality is not higher than a predetermined value (No in step S403), go to step S404.

In step S1303, the display control unit 805 determines whether the broadcast station configured to broadcast a signal of the reception frequency acquired by the reception frequency acquisition unit 101 is a broadcast station not configured to transmit second data, by referring to the determination result stored in the broadcast station storage unit 808. When the broadcast station is determined to be a broadcast station not configured to transmit second data (Yes in step S1303), the display control unit 805 predicts that second data is not acquired, and goes to step S404. On the other hand, when the broadcast station is determined to be a broadcast station configured to transmit second data (No in step S1303), the display control unit 805 predicts that second data is acquired, and goes to step S405. Operations of step S404 or later in the embodiment are the same as those shown in the flowchart of the first embodiment.

As explained above, in the embodiment, a broadcast station configured to broadcast second data is previously searched, and is stored in the broadcast station storage unit 808. By referring to information stored in the broadcast station storage unit 808, when receiving a signal from a broadcast station not configured to broadcast second data, first data is displayed regardless of reception quality. As a result, response of the apparatus to a user is increased.

Embodiment 5

Determine a Station not Configured to Transmit Character Data by Third Data

In the embodiment 4, it is based on the reception quality and second data at the frequency being currently received to determine whether or not a broadcast station, which is configured to broadcast a signal of the reception frequency acquired by the reception frequency acquisition unit 101, is a broadcast station configured to transmit second data. However, when a size of second data is large, it takes a long time to acquire second data. In the embodiment, whether a broadcast station transmits second data is determined based on the acquisition status of third data instead of second data.

For example, when second data is detailed data of a song being broadcasted in digital broadcasting, it may take a long time about 30 seconds to acquire the data. However, a broadcast station transmits also third data indicating that the broadcast station is a digital broadcast station, and third data can be acquired in a short time for example within 5 seconds. When the broadcast station is not a digital broadcast station, detailed data of a song in digital broadcasting is not transmitted, and whether the broadcast station is a broadcast station configured to transmit second data can be determined by acquiring third data.

Figure 15:
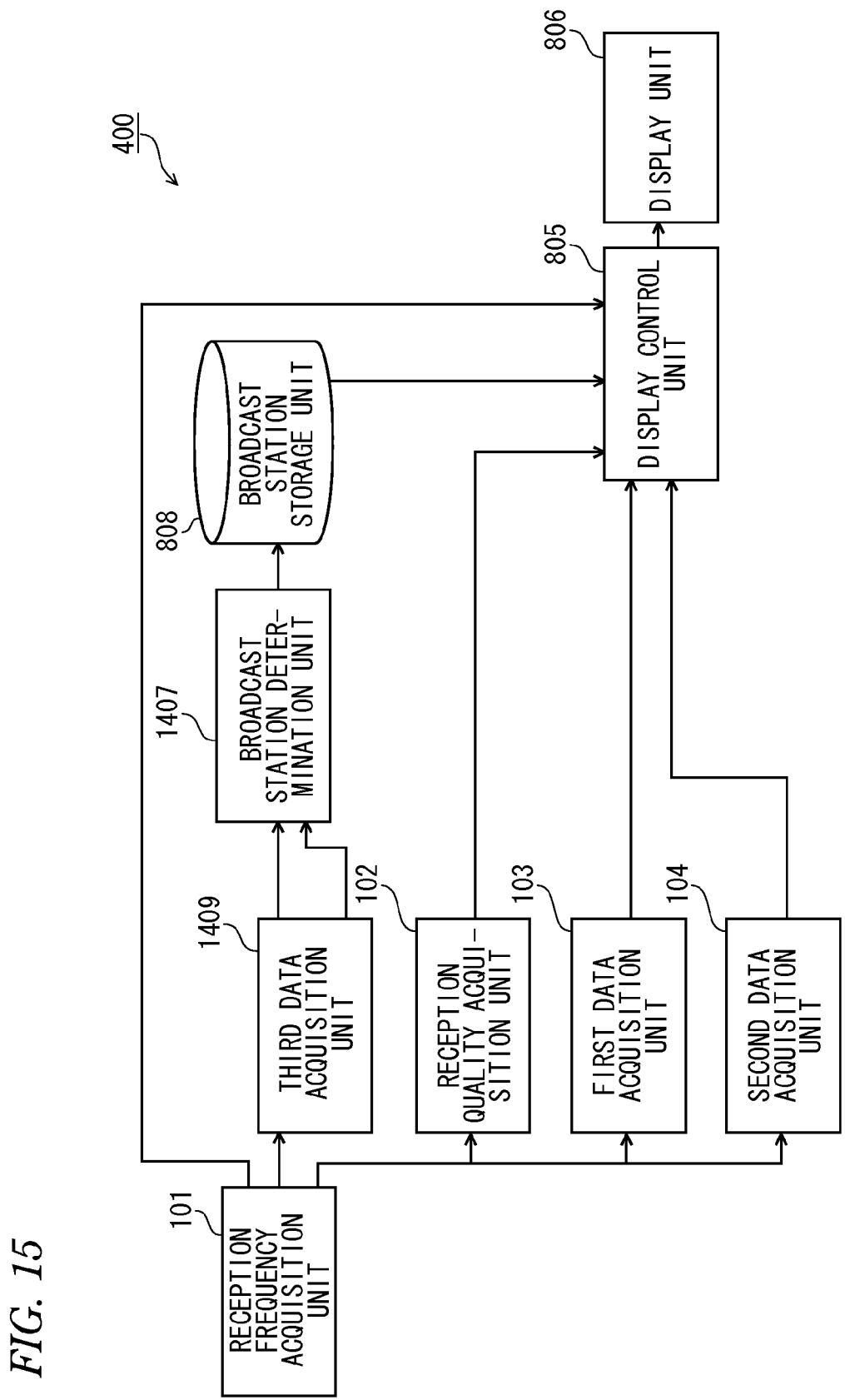
FIG. 15 is a block diagram showing an internal configuration of a display control apparatus of a fifth embodiment.

FIG. 15 is a block diagram showing an internal configuration of a display control apparatus 400 of an embodiment 5. The same reference numerals and signs are assigned to the same components as those of the display control apparatus 300 of the embodiment 4 shown in FIG. 9, and description thereof is omitted. The display control apparatus 400 of the embodiment 5 is provided with a broadcast station determination unit 1407 instead of the broadcast station determination unit 807, and is further provided with a third data acquisition unit 1409.

The third data acquisition unit 1409 acquires third data, which is information for determining whether a broadcast station configured to broadcast a signal of the reception frequency acquired by the reception frequency acquisition unit 101 is a broadcast station configured to transmit second data, from a signal of the reception frequency acquired by the reception frequency acquisition unit 101. Third data is data indicating digital broadcasting, for example.

The broadcast station determination unit 1407 determines whether a broadcast station configured to broadcast a signal of the reception frequency acquired by the reception frequency acquisition unit 101 is a broadcast station configured to transmit second data, based on the reception quality of a signal of the reception frequency acquired by the reception quality acquisition unit 102 and third data acquired by the third data acquisition unit 1409. Specifically, when the third data acquisition unit 1409 acquires third data, the broadcast station determination unit 1407 determines the broadcast station to be a broadcast station configured to transmit second data. On the other hand, the broadcast station determination unit 1407 determines the station to be a broadcast station not configured to transmit second data, when third data cannot be acquired even after a predetermined time elapses in a state that the reception quality acquired by the reception quality acquisition unit 102 remains at a predetermined value or higher.

Embodiment 6

Determine a Broadcast Station by Back Searching by a Sub Tuner

In the fourth embodiment, whether a broadcast station configured to broadcast a signal of the reception frequency acquired by the reception frequency acquisition unit 101 is a broadcast station configured to transmit second data, based on the reception quality and second data at the frequency being received. However, it is impossible to determine whether a broadcast station transmits second data, until a signal is actually acquired by setting a reception frequency to a corresponding frequency in a tuner. When there are two tuners, while a main tuner is receiving and outputting a broadcast of a certain frequency, a sub tuner can determine whether a broadcast station transmits second data with respect to another frequency. Thus, when there are two tuners, before a main tuner receives and outputs a broadcast, a sub tuner can determine whether a broadcast station transmits second data.

Figure 16:
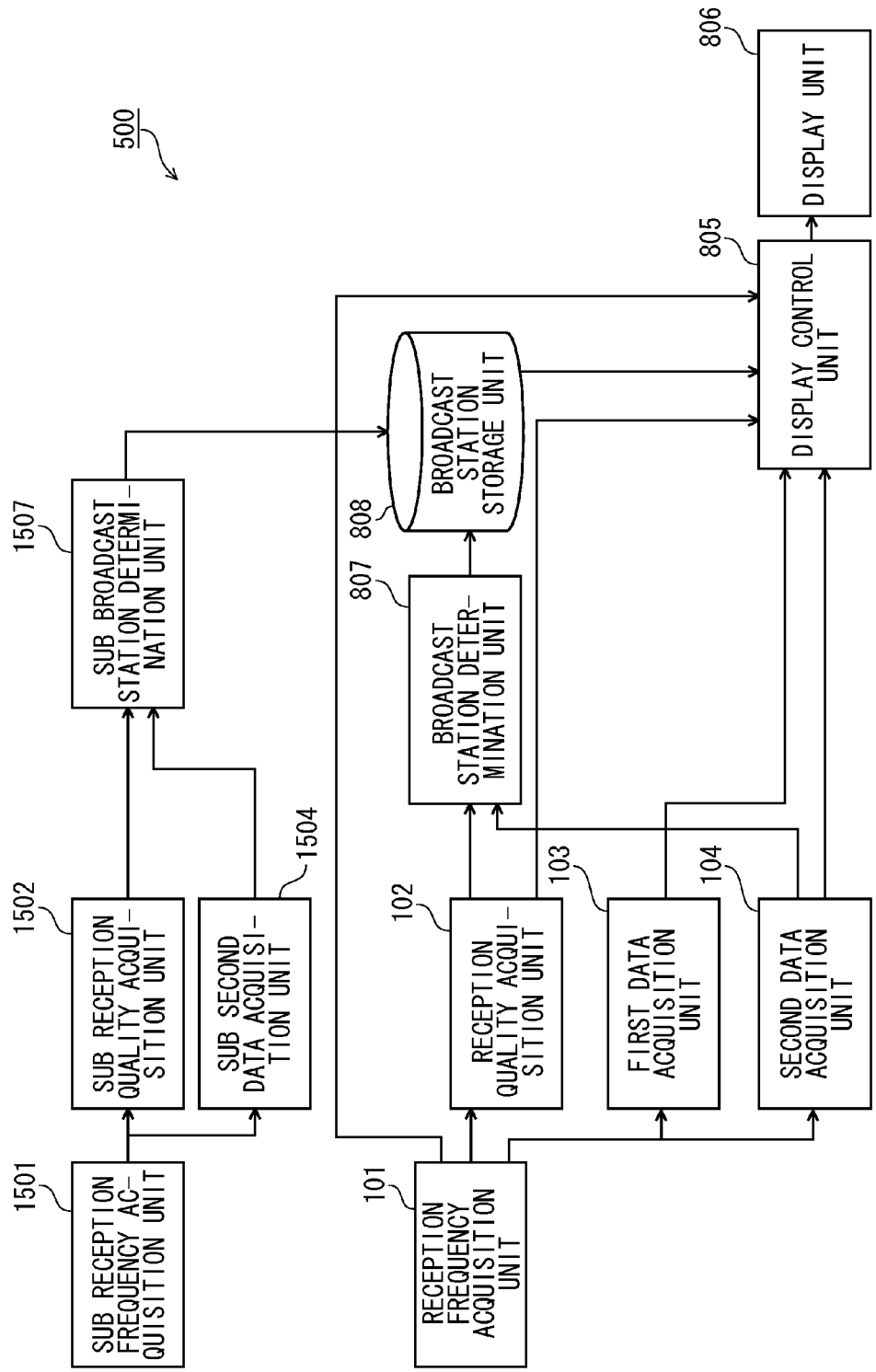
FIG. 16 is a block diagram showing an internal configuration of a display control apparatus of a sixth embodiment.

FIG. 16 is a block diagram showing an internal configuration of a display control apparatus 500 of an embodiment 6. The same reference numerals are assigned to the same components as those of the display control apparatus 300 of the embodiment 4 shown in FIG. 9, and description thereof is omitted. The display control apparatus 500 of the embodiment 6 is further provided with a sub reception frequency acquisition unit 1501 constituting a sub tuner, a sub reception quality acquisition unit 1502, a sub second data acquisition unit 1504, and a sub broadcast station determination unit 1507.

The sub reception frequency acquisition unit 1501 acquires a frequency of a broadcast station being received by a sub tuner. Because it is a sub tuner, the sound of the broadcast station may not really come out of a speaker. The sub reception frequency acquisition unit 1501 acquires a value of "98.1 MHz", for example, that is a reception frequency of a sub tuner during back searching.

The sub reception quality acquisition unit 1502 acquires reception quality of a signal of the reception frequency acquired by the sub reception frequency acquisition unit 1501. Reception quality is electric field strength, for example. During back searching, a sub tuner switches a reception frequency at regular intervals. This enables proactive determination of a broadcast station for all frequency bands.

The sub second data acquisition unit 1504 acquires sub second data about a broadcast station name from a signal of the reception frequency acquired by the sub reception frequency acquisition unit 1501. For example, the sub second data acquisition unit 1504 acquires a broadcast station name "D STATION-HD1" of digital broadcasting of a reception frequency "98.1 MHz" as sub second data.

The sub broadcast station determination unit 1507 determines whether or not a broadcast station, which is configured to broadcast a signal of the reception frequency acquired by the sub reception frequency acquisition unit 1501, is a broadcast station configured to transmit second data. This determination is performed based on the reception quality acquired by the sub reception quality acquisition unit 1502 and the second data acquired by the sub second data acquisition unit 1504. The sub broadcast station determination unit 1507 further stores the determination result in the broadcast station storage unit 808. Specifically, when the sub second data acquisition unit 1504 acquires sub second data, the sub broadcast station determination unit 1507 determines the broadcast station to be a broadcast station configured to transmit second data. On the other hand, the sub broadcast station determination unit 1507 determines the station to be a broadcast station not configured to transmit second data, when sub second data cannot be acquired even after a predetermined time elapses in a state that the reception quality acquired by the reception quality acquisition unit 1502 remains at a predetermined value or higher.

Embodiment 7

Change the Timing of Determination when a Vehicle Speed is High and a Reception Status is Unstable In the embodiments 1 to 6, whether to display first data is immediately determined at the timing when first data is acquired. However, while a vehicle equipped with a display control apparatus is running, reception quality may suddenly change due to entering/leaving a tunnel, obstacles such as buildings, or influence of jamming. For example, although reception quality is high at the timing when first data is acquired, thereafter the reception quality may suddenly deteriorate, and second data may not be acquired. In this case, if non-display of first data is determined at the timing when first data is acquired, thereafter second data cannot be acquired, neither first data nor second data is displayed on the display unit.

In addition, although reception quality is low at the timing when first data is acquired, the reception quality may suddenly improve, and second data can soon be acquired. In this case, if display of first data is determined at the timing when first data is acquired, and second data is acquired immediately thereafter, the second data is displayed on the display unit immediately after the first data, causing screen flickering.

Thus, in the embodiment, while a vehicle is running at a high speed, timing to determine whether to display first data based on reception quality is delayed compared to while a vehicle is stopping. Further, while a vehicle is running, determination of whether to display first data based on reception quality may not be performed. As an example of not using reception quality, while a vehicle is running, first data is displayed on the display unit immediately after acquiring the first data, and second data is not displayed for a certain time even after acquiring the second data, thereby preventing flickering. Thus, even when reception quality suddenly changes due to entering/leaving a tunnel, it is possible to prevent screen flickering and display a blank for a long period of time.

Figure 17:
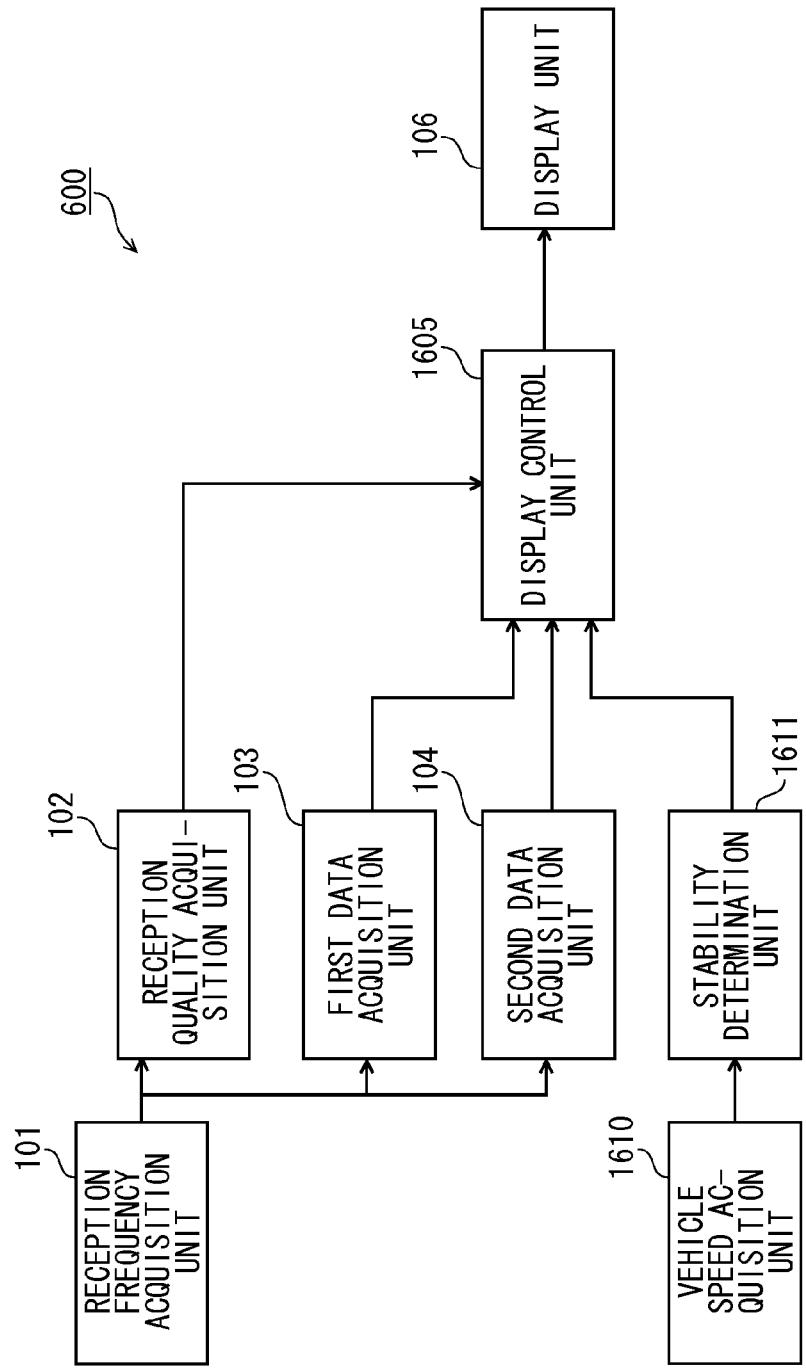
FIG. 17 is a block diagram showing an internal configuration of a display control apparatus of a seventh embodiment.

FIG. 17 is a block diagram showing an internal configuration of a display control apparatus 600 of an embodiment 7. The same reference numerals and signs are assigned to the same components as those of the display control apparatus 100 of the embodiment 1 shown in FIG. 1, and description thereof is omitted. The display control apparatus 600 of the embodiment 7 is provided with a display unit 1605 instead of the display unit 105, and is further provided with a vehicle speed acquisition unit 1610, and a stability determination unit 1611.

The vehicle speed acquisition unit 1610 acquires speed information of a vehicle equipped with the display control apparatus 600 of the embodiment. The vehicle speed acquisition unit 1610 acquires vehicle speed information "60 km/h", for example.

The stability determination unit 1611 determines whether reception quality is stable or unstable, from the vehicle speed information acquired by the vehicle speed acquisition unit 1610. Specifically, when a vehicle speed is faster than a predetermined value (for example, 10 km/h), the stability determination unit 1611 determines reception quality to be unstable.

When the reception quality acquired by the reception quality acquisition unit 102 at the reception frequency acquired by the reception frequency acquisition unit 101 is higher than a predetermined value, the display control unit 1605 of the embodiment estimates time for the second data acquisition unit 104 to acquire second data is short, and controls not to display the first data acquired by the first data acquisition unit 103 at least until acquisition of second data. However, the timing to determine display by reception quality is different depending on the result of determination by the stability determination unit 1611. In other words, when the stability determination unit 1611 determines reception quality to be stable, the display control unit 1605 determines display when first data is acquired. On the other hand, when the stability determination unit 1611 determines reception quality to be unstable, the display control unit 1605 does not determine display when first data is acquired, and delays the timing to determine display by a predetermined time.

The predetermined time that the display control unit 1605 delays the display determination is, for example, a maximum time until second data is acquired with the reception quality remained high. For example, it is assumed that the reception quality is unstable when the predetermined time is set to 10 seconds, and the reception quality is "10 dBµV" at a reception frequency "98.1 MHz" ten seconds after acquiring first data. In this case, as the reception quality is 30 dBµV or lower, the display control unit 1605 estimates the time to acquire second data to be long, and controls the display unit 106 to display the reception frequency "98.1 MHz" as the first data.

Further, it is assumed that reception quality is unstable, and ten seconds after acquiring first data, reception quality is "60 dBµV" at a reception frequency "98.1 MHz". In this case, as the reception quality is 30 dBµV or higher, the display control unit 1605 estimates the time to acquire second data is short, and controls the display unit 106 not to display the reception frequency "98.1 MHz" as the first data, and to display a blank until acquisition of second data. Of course, after acquiring the first data, when second data can be acquired before determining display depending on the level of reception quality, the display control unit 1605 controls to immediately display the second data. Further, when the stability determination unit 1611 determines the reception quality to be unstable, the display control unit 1605 does not delay the timing to determine display by a predetermined time, and may not perform the display determination itself.

Figure 18:
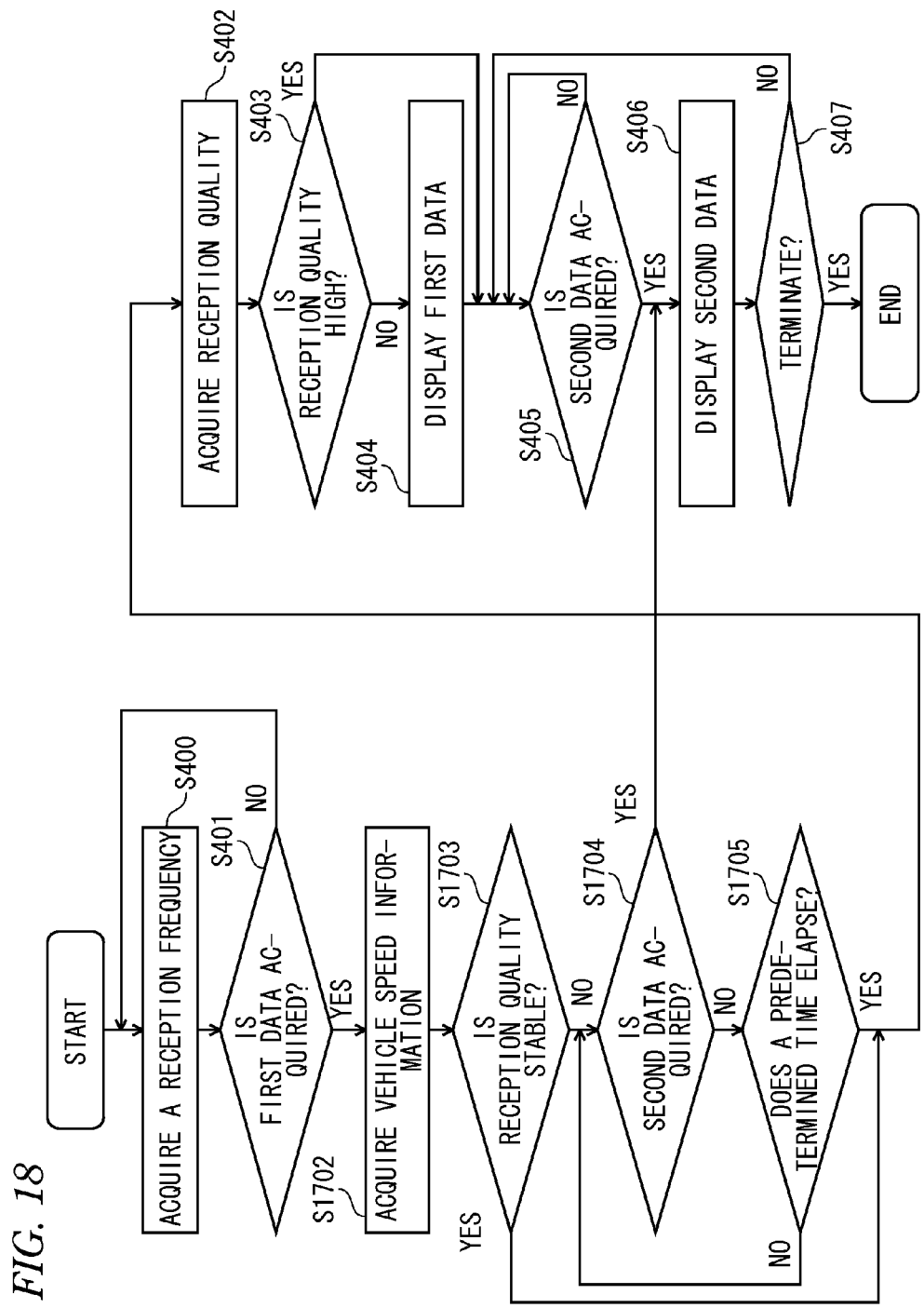
FIG. 18 is a flowchart showing operations of a display control apparatus of an embodiment 7.

Next, operations of a display control apparatus 600 are explained with reference to FIG. 18. FIG. 18 is a flowchart showing operations of a display control apparatus 600 of the embodiment 7. In the flowchart shown in FIG. 18, operations of steps S1702 to S1705 are performed in addition to the operations of the flowchart shown in FIG. 5.

The reception frequency acquisition unit 101 acquires a frequency of a broadcast station being received or to be received (step S400). Next, the first data acquisition unit 103 acquires first data about a reception frequency from a signal of the reception frequency acquired in step S400 (step S401). When the first data can be acquired (Yes in step S401), go to step S1702. When the first data cannot be acquired (No in step S401), go back to step S401.

In step S1702, the vehicle speed acquisition unit 1610 acquires speed information of a vehicle equipped with the display control apparatus 600 of the embodiment. Next, the stability determination unit 1611 determines whether reception quality is stable or unstable (step S1703), from the vehicle speed information acquired by the vehicle speed acquisition unit 1610. When the reception quality is stable (Yes in step S1703), go to step 402. When the reception quality is unstable (No in step S1703), go to step 1704.

In step S1704, the second data acquisition unit 104 acquires second data from a signal of the reception frequency acquired by the reception frequency acquisition unit 101. When the second data can be acquired in step S1704 (Yes in step S1704), go to step S406, while the second data cannot be acquired (No in step S1704), go to step S1705.

In step S1705, the display control unit 1605 does not determine display depending on the level of reception quality, and delays the display determination by a predetermined time. When a predetermined time passes after acquiring the first data in step S401 (Yes in step S1705), go to step S402. When a predetermined time does not pass (No in step S1705), go back to step S1704. Operations of step S402 or later in the embodiment are the same as those of the flowchart of the embodiment 1 shown in FIG. 5.

Embodiment 8

Reception Quality Changes, and Change the Determination Timing when Reception Status is Unstable In the embodiment 7, whether reception quality is stable or unstable is determined by a vehicle speed. Stability of reception quality may be determined by a change in reception quality without using a vehicle speed. For example, when reception quality greatly changes in most recent time, reception quality is determined to be unstable. According to the determination method, even when reception quality suddenly changes due to entering/leaving a tunnel or the like, it is possible to prevent screen flickering and displaying a blank for a long period of time.

Figure 19:
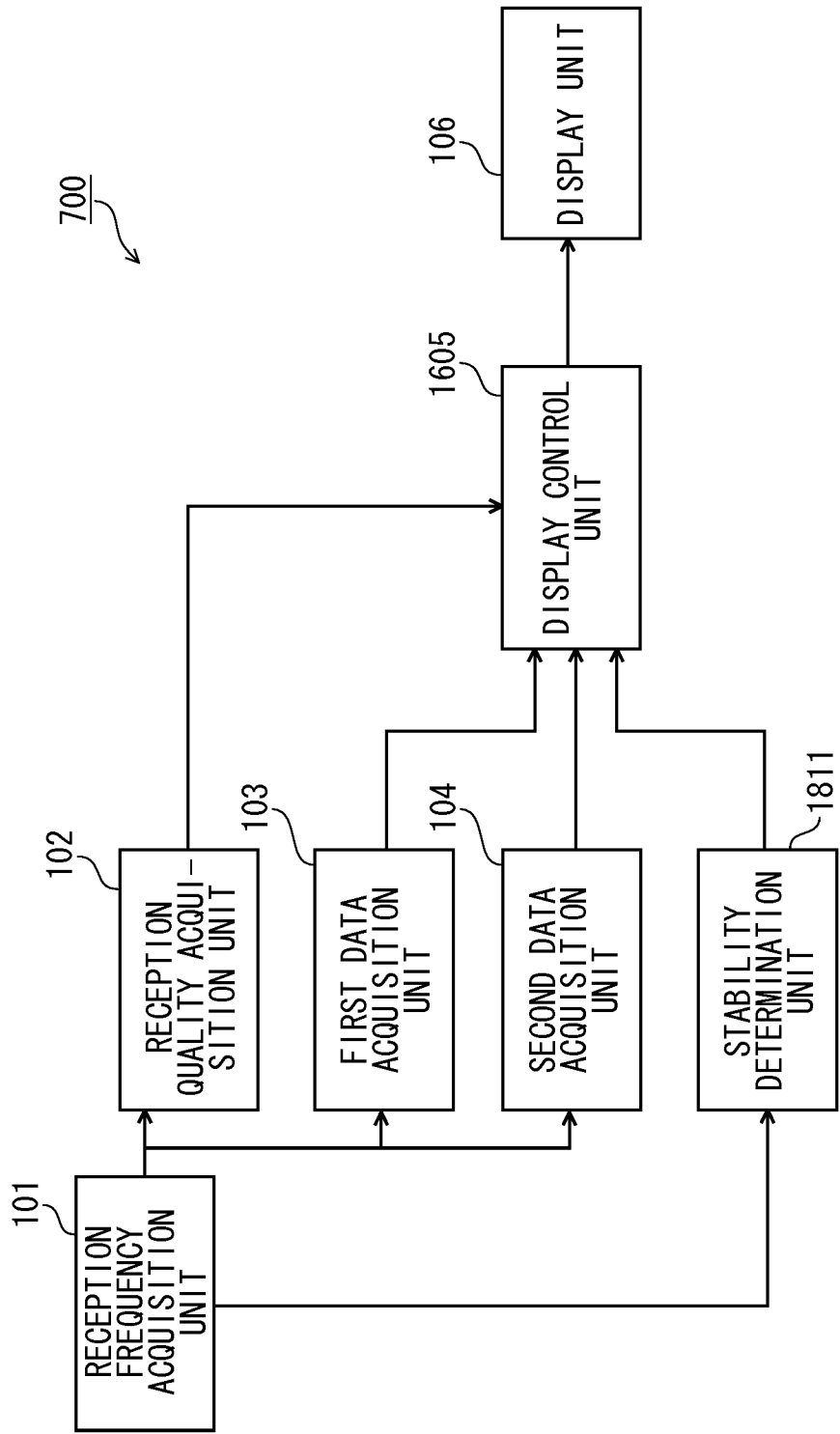
FIG. 19 is a block diagram showing an internal configuration of a display control apparatus of an eighth embodiment.

FIG. 19 is a block diagram showing an internal configuration of a display control apparatus 700 of an embodiment 8. The same reference numerals and signs are assigned to the same components as those of the display control apparatus 100 of the embodiment 1 shown in FIG. 1, and description thereof is omitted. The display control apparatus 700 of the embodiment 8 is provided with a display control unit 1605 instead of the display control unit 105, and is further provided with a stability determination unit 1811. The display control unit 1605 of the embodiment is similar to the display control unit 1605 explained in the embodiment 7.

The stability determination unit 1811 measures a change in reception quality of a signal of the reception frequency acquired by the reception frequency acquisition unit 101, and determines whether reception quality is stable or unstable. Specifically, when reception quality greatly changes in most recent time, the stability determination unit 1811 determines the reception quality to be unstable. However, the reception quality may change when the reception frequency acquired by the reception frequency acquisition unit 101 changes; therefore the stability determination unit 1811 measures a change in reception quality from the time when the reception frequency changes.

When a predetermined time to measure a change in reception quality is 10 seconds, for example, the stability determination unit 1811 measures reception quality in most recent 10 seconds every one second. The stability determination unit 1811 calculates an average value of an absolute value of a change in the reception quality, and determines the reception quality to be unstable when the average value exceeds a predetermined threshold value (for example, 5 dBμV). Further, when ten seconds do not pass after the time when a reception frequency changes, the stability determination unit 1811 measures a change in the reception quality from the time when the reception frequency changes, and determines whether the reception quality is stable or unstable.

Embodiment 9

Recheck the Display Determination

In the embodiments 1 to 8, whether to display first data is determined only once. However, when reception quality is changed while a vehicle equipped with a display control apparatus is running, the display determination may be periodically performed. For example, when second data cannot be acquired for a predetermined time after non-display of first data is determined, whether to display is determined again depending on the level of reception quality. This can prevent displaying a blank for a long period of time, even when the reception quality suddenly deteriorates when a vehicle enters a tunnel, for example.

Figure 20:
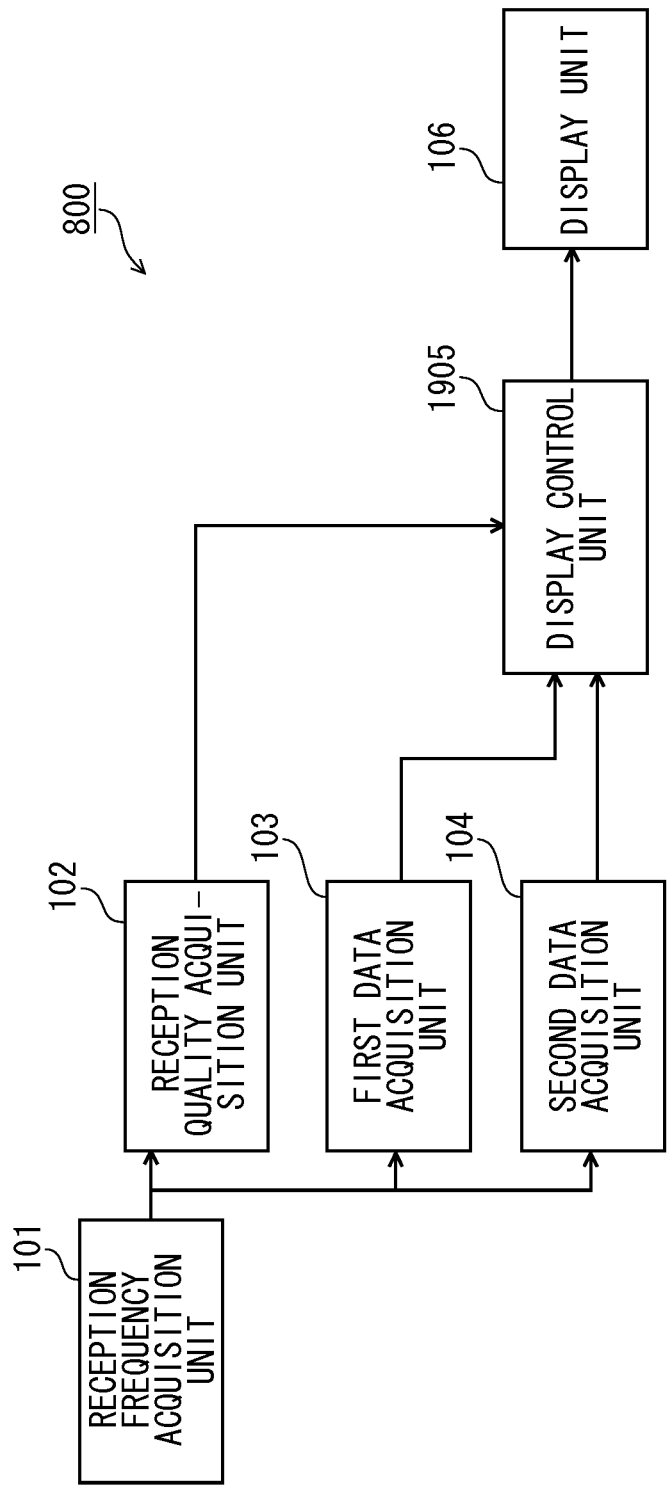
FIG. 20 is a block diagram showing an internal configuration of a display control apparatus of a ninth embodiment.

FIG. 20 is a block diagram showing an internal configuration of a display control apparatus 800 of an embodiment 9. The same reference numerals and signs are assigned to the same components as those of the display control apparatus 100 of the embodiment 1 shown in FIG. 1, and description thereof is omitted. The display control apparatus 800 of the embodiment 9 is provided with a display control unit 1905 instead of the display control unit 105.

When the reception quality acquired by the reception quality acquisition unit 102 at the reception frequency acquired by the reception frequency acquisition unit 101 is higher than a predetermined value, the display control unit 1905 of the embodiment estimates the time for the second data acquisition unit 104 to acquire second data is short, and controls not to display the first data acquired by the first data acquisition unit 103 at least until acquisition of second data.

In the embodiment, there are two or more timings for the display control unit 1905 to determine whether to display first data based on the level of reception quality level. Even when determining to wait for acquisition of second data without displaying first data, the display control unit 1905 determines again, when a predetermined time passes after the display determination. For example, when a predetermined time to re-determination is one second, the display control unit 1905 repeats determination of whether to display first data every one second after the previous determination. This is because it is likely that the reception quality may decrease during waiting even after determination is made to wait until acquisition of second data without displaying first under high reception quality.

Figure 21:
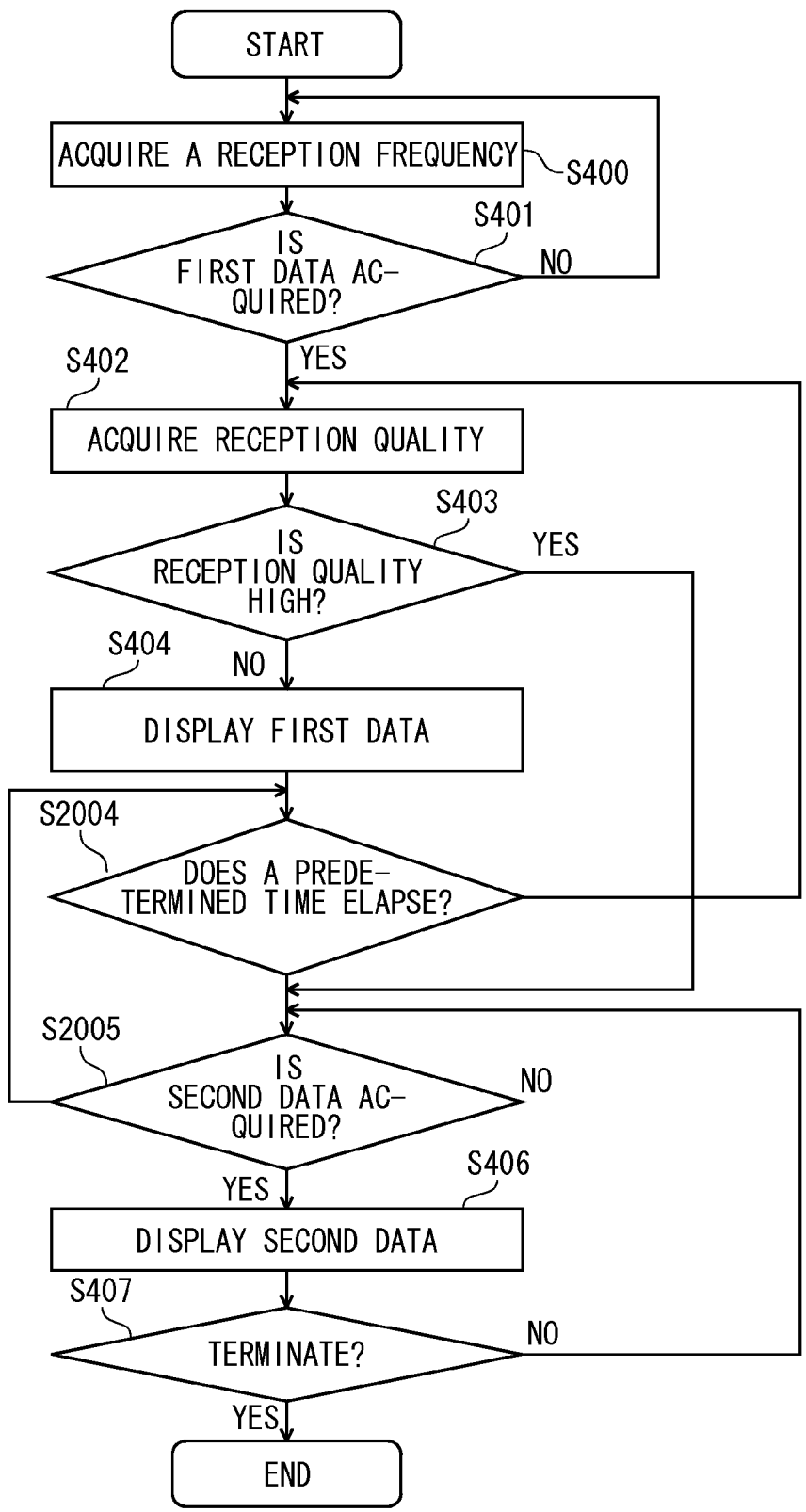
FIG. 21 is a flowchart showing operations of a display control apparatus of a ninth embodiment.

Next, operations of the display control apparatus 800 are explained with reference to FIG. 21. FIG. 21 is a flowchart showing operations of the display control apparatus 800 of the embodiment 9. In the flowchart shown in FIG. 21, the operation of S2004 is performed in addition to the operations of the flowchart shown in FIG. 5, and a step S2005 is performed instead of S405.

The reception frequency acquisition unit 101 acquires a frequency of a broadcast station being received or to be received (step S400). Next, the first data acquisition unit 103 acquires first data about a reception frequency from a signal of the reception frequency acquired in step S400 (step S401). When the first data can be acquired (Yes in step S401), go to step S402. When the first data cannot be acquired (No in step S401), go back to step S401.

In step S402, the reception quality acquisition unit 102 acquires reception quality of a signal of the reception frequency acquired by the reception frequency acquisition unit 101. Next, the display control unit 1905 determines whether the reception quality acquired by the reception quality acquisition unit 102 is higher than a predetermined value (step S403). When the reception quality is higher than a predetermined value (Yes in step S403), go to step S2005. When the reception quality is not higher than a predetermined value (No in step S403), go to step S404. In step S404, the display unit 106 displays the first data acquired by the first data acquisition unit 103, and goes to step S2004.

In step S2004, the display control unit 1905 determines whether a predetermined time passes after determination of whether to display first data according to the level of reception quality. When a predetermined time passes (Yes in step S2004), go back to step S402. When a predetermined time does not pass (No in step S2004), go to step S2005. In step S2005, the second data acquisition unit 104 acquires second data from a signal of the reception frequency acquired by the reception frequency acquisition unit 101. When the second data can be acquired in step S2005 (Yes in step S2005), go to step S406, while the second data cannot be acquired (No in step S2005), go back to step S2004.

In step S406, the display unit 106 displays the second data acquired by the second data acquisition unit 104. Next, the display control apparatus 800 determines whether to terminate a sequence of operations (step S407). To terminate the sequence (Yes in step S407), finish the flow. Not to terminate the sequence (No in step S407), go back to step S2005.

Although embodiments of the display control apparatus according to the invention have been described hereinbefore, the invention is not to be limited to the embodiments or modifications thereof. It is to be noted that various modifications and alterations might be made by those skilled in the art without departing from the spirit or essential characteristics of the invention. Such modifications and alterations, or different embodiments or other embodiments formed by combining the constituent elements in their modifications are to be understood as included within the scope of the invention.

Moreover, the invention can be modified as described below.

(1) The above display control apparatus can specifically be realized by a computer system comprising a microprocessor, a ROM, a RAM, a hard disk unit, a display unit, a keyboard, a mouse, and so on. A ROM or a hard disk unit stores a computer program. As the microprocessor operates in accordance with the computer program, the display control apparatus achieves its functions. Here, the computer program is configured by combining two or more instruction codes indicating commands to the computer. Each apparatus may be a computer system comprising not all of microprocessor, ROM, RAM, hard disk unit, display unit, keyboard, and mouse, but comprising some of them.

(2) Some or all of the components of the above display control apparatus may be comprised of a system large-scale integration (LSI). The system LSI is a super-multifunctional LSI manufactured by integrating a plurality of components on one chip, and is specifically a computer system including a microprocessor, a ROM, a RAM, and the like. A ROM stores a computer program. As a microprocessor operates in accordance with a computer program, a system LSI achieves its functions.

Here, although a system LSI is assumed, it may be called an IC, LSI, super LSI, or ultra LSI. A method of integrating a circuit is not limited to an LSI. A dedicated circuit or a general-purpose processor may be used to realize an integrated circuit. After production of an LSI, it is possible to use a field programmable gate array (FPGA) or a reconfigurable processor enabling reconfiguration of connection or setting of a circuit cell inside an LSI.

Further, instead of an LSI, when an integrated circuit technique is developed by advanced semiconductor technology or other derivative technology, it is of course possible to use the technique for integrating a function block.

(3) Some or all of the components of above each apparatus may be comprised of an IC card removable from each apparatus, or a single module. An IC card or a module is a computer system comprising a microprocessor, a ROM, a RAM, and the like. An IC card or a module may include a super-multifunctional LSI mentioned above. As a microprocessor operates in accordance with a computer program, an IC card or a module achieves its functions.

(4) The invention may be a method comprising steps of operations of characteristic parts of the display control apparatus described above. The invention may be a computer program that realizes such a method by a computer, or may be a digital signal comprising a computer program.

Further, the invention may also be realized by a computer program or a digital signal recorded on a computer-readable recording medium such as a flexible disk, a hard disk, a CD-ROM, a MO, a DVD, a DVD-ROM, a DVD-RAM, a BD (Blue-ray Disk (registered trademark)), or a semiconductor memory. The invention may also be realized by a computer program or a digital signal recorded on such a recording medium.

Further, the invention may transmit a computer program or a digital signal via a telecommunications line, a wireless or wired communication line, a network represented by the Internet, or data broadcasting, or the like.

Further, the invention may be implemented by other independent computer system, by transmitting a program or a digital signal recorded on a recording medium, or transmitting a program or a digital signal via a network, or the like.

While the present invention has been described in detail, or with reference to the specific embodiments, it is apparent for those skilled in the art that the invention may be modified and changed in various manners without departing from the scope and spirit of the invention.

This invention is based on Japanese Patent Application (Japanese Patent Application No. 2011-261398) filed on Nov. 30, 2011, the content of which is incorporated herein by reference.

A display control apparatus according to the invention is useful for a broadcast receiving apparatus such as a car-mounted radio, which prevents intermittent information display or screen flickering, and improves visibility.

DESCRIPTION OF REFERENCE NUMERALS AND SIGNS 100, 200, 300, 400, 500, 600, 700, 800 Display control apparatus
101 Reception frequency acquisition unit
102 Reception quality acquisition unit
103 First data acquisition unit
104 Second data acquisition unit
105, 805, 1605, 1905 Display control unit
106, 506, 806 Display unit
807, 1407 Broadcast station determination unit
808 Broadcast station storage unit
1409 Third data acquisition unit
1501 Sub reception frequency acquisition unit
1502 Sub reception quality acquisition unit
1504 Sub second data acquisition unit
1507 Sub broadcast station determination unit
1610 Vehicle speed acquisition unit
1611, 1811 Stability determination unit

The invention claimed is:
1. A display control apparatus which receives and displays character data, comprising:
a reception frequency acquisition unit configured to acquire a frequency to be received,
a reception quality acquisition unit configured to acquire reception quality of a signal of the reception frequency, a first data acquisition unit configured to acquire first data at the reception frequency, a second data acquisition unit configured to acquire second data from a signal of the reception frequency, a display control unit configured to control display of the first data until acquisition of the second data after acquisition of the first data, and a display unit configured to display the first data or the second data in accordance with control of the display control unit.

2. The display control apparatus according to claim 1, wherein the display control unit controls not to display the first data at least until acquisition of the second data, when the reception quality is higher than a predetermined value.

3. The display control apparatus according to claim 2, further comprising:

a broadcast station determination unit which determines whether a broadcast station configured to broadcast a signal of the reception frequency is a broadcast station configured to transmit the second data, and a broadcast station storage unit which stores determination result of the broadcast station determination unit for each reception frequency, wherein the display control unit controls to display the first data, when the broadcast station storage unit stores a determination result that a broadcast station of the reception frequency is a broadcast station not configured to transmit the second data, even when the reception quality is higher than the predetermined value.

4. The display control apparatus according to claim 3, wherein: the broadcast station determination unit determines a broadcast station configured to broadcast a signal to be a broadcast station configured to transmit the second data, when the second data is acquired from the signal of the reception frequency, and determines the broadcast station configured to broadcast the signal to be a broadcast station not configured to transmit the second data, when the second data is not acquired even after a predetermined time passes in a state that reception quality of a signal of the reception frequency remains at a predetermined value or higher.

5. The display control apparatus according to claim 3, further comprising a third data acquisition unit which acquires, from the signal, third data that is information for determining whether the broadcast station configured to broadcast the signal of the reception frequency is a broadcast station configured to transmit second data, wherein the broadcast station determination unit determines the broadcast station configured to broadcast the signal of the reception frequency to be a broadcast station configured to transmit the second data, when the third data acquisition unit acquires the third data, and determines the broadcast station configured to broadcast the signal to be a broadcast station not configured to transmit the second data, when the third data is not acquired even after a predetermined time passes in a state that reception quality of a signal of the reception frequency remains at a predetermined value or higher.

6. The display control apparatus according to claim 3, further comprising:

a sub reception frequency acquisition unit configured to acquire a frequency received by a sub tuner;

a sub reception quality acquisition unit configured to acquire reception quality of a signal of reception frequency of the sub tuner;

a sub second data acquisition unit configured to acquire sub second data from a signal of the reception frequency of the sub tuner, and a sub broadcast station determination unit configured to determine whether the broadcast station configured to broadcast the signal of the reception frequency of the sub tuner is a broadcast station configured to transmit the second data, based on the reception quality of the signal of the reception frequency of the sub tuner and the sub second data, wherein the broadcast station storage unit stores a determination result of the sub broadcast station determination unit for each reception frequency.

7. The display control apparatus according to claim 2, further comprising a stability determination unit configured to determine whether the reception quality is stable or unstable, wherein the display control unit controls to delay display of the first data, when the stability determination unit determines the reception quality to be unstable, even when the reception quality is not higher than a predetermined value.

8. The display control apparatus according to claim 7, further comprising a vehicle speed acquisition unit configured to acquire speed information of a vehicle equipped with the display control apparatus, wherein the stability determination unit determines the reception frequency to be unstable, when a speed of the vehicle is higher than a predetermined value.

9. The display control apparatus according to claim 7, wherein the stability determination unit determines the reception quality to be unstable, when the reception quality changes greatly in most recent predetermined time.

10. The display control apparatus according to claim 2, wherein the display control unit controls to display the first data, when the reception quality decreases to a predetermined value or lower even once in a period from acquisition of the first data to acquisition of the second data.

11. A display control method that a display control apparatus receives and displays character data, comprising:

a reception frequency acquisition step of acquiring a frequency to be received, a reception quality acquisition step of acquiring reception quality of a signal of the reception frequency, a first data acquisition step of acquiring first data at the reception frequency, a second data acquisition step of acquiring second data from a signal of the reception frequency, a display control step of controlling display of the first data until acquisition of the second data after acquisition of the first data, based on the reception quality, and a display step of displaying the first data or the second data in accordance with control on the display control step.

12. A non-transitory recording medium recorded with a program to cause a computer to execute each step of the display control method according to claim 11.

* * * * *